United States Patent
Wang et al.

(10) Patent No.: US 11,350,128 B2
(45) Date of Patent: May 31, 2022

(54) METHODS, SYSTEMS, DEVICES AND COMPUTER-READABLE MEDIUMS FOR ENCODING AND DECODING TRANSFORM MATRICES MATCHING RESIDUAL CHARACTERISTICS OF PREDICTION RESIDUAL BLOCK

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Guisen Xu, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/641,416

(22) PCT Filed: Feb. 19, 2019

(86) PCT No.: PCT/CN2019/075468
§ 371 (c)(1),
(2) Date: Feb. 24, 2020

(87) PCT Pub. No.: WO2020/155211
PCT Pub. Date: Aug. 6, 2020

(65) Prior Publication Data
US 2022/0038745 A1  Feb. 3, 2022

(30) Foreign Application Priority Data

Feb. 1, 2019  (CN) .......................... 201910105653.9

(51) Int. Cl.
H04N 19/61  (2014.01)
H04N 19/625  (2014.01)
H04N 19/176  (2014.01)

(52) U.S. Cl.
CPC .......... *H04N 19/61* (2014.11); *H04N 19/176* (2014.11); *H04N 19/625* (2014.11)

(58) Field of Classification Search
CPC ..... H04N 19/61; H04N 16/176; H04N 19/625
See application file for complete search history.

(56) References Cited

U.S. PATENT DOCUMENTS 9,723,313 B2 * 8/2017 Yang ................... H04N 19/122
2012/0177108 A1 * 7/2012 Joshi ................... H04N 19/625
375/240.18

(Continued)

FOREIGN PATENT DOCUMENTS

CN  101609681 A  12/2009
CN  102045560 A  5/2011
(Continued)

*Primary Examiner* — Jessica M Prince
(74) *Attorney, Agent, or Firm* — Miles & Stockbridge P.C.

(57) ABSTRACT

The present application provides methods, systems, devices and computer-readable mediums for encoding and decoding transform. A method of the present application comprises: performing transform-encoding on a prediction residual block separately using a plurality of transform matrices, to obtain transformed residual blocks; based on the transformed residual block, determining, by a rate-distortion optimization decision, a transform matrix or a combination of transform matrices matching the residual characteristics of the prediction residual block from the plurality of transform matrices, and determining a transformed residual block to be outputted in a bitstream. Compared with the prior art, the method of the embodiments of the present invention performs a residual transform using transform matrices that (Continued)

are more closely matched with the residual characteristic, thereby improving the expression of the residual signal and improving the coding efficiency of the residual block.

14 Claims, 4 Drawing Sheets

(56) References Cited

U.S. PATENT DOCUMENTS

| | | | | |
|---|---|---|---|---|
| 2020/0162729 A1* | 5/2020 | Lee | ......................... | H04N 19/48 |
| 2020/0404296 A1* | 12/2020 | Puri | ........................ | H04N 19/60 |
| 2021/0076043 A1* | 3/2021 | Zhang | .................. | H04N 19/439 |

FOREIGN PATENT DOCUMENTS

| | | | |
|---|---|---|---|
| CN | 102281435 A | | 12/2011 |
| CN | 102301707 A | | 12/2011 |
| KR | 20120033951 A | | 4/2012 |

\* cited by examiner

METHODS, SYSTEMS, DEVICES AND COMPUTER-READABLE MEDIUMS FOR ENCODING AND DECODING TRANSFORM MATRICES MATCHING RESIDUAL CHARACTERISTICS OF PREDICTION RESIDUAL BLOCK

CROSS-REFERENCE TO RELATED APPLICATIONS

The present application is a national stage filing under 35 U.S.C. § 371 of PCT/CN2019/075468, filed on Feb. 19, 2019 which claims priority to Chinese Application No. 201910105653.9, filed on Feb. 1, 2019. The applications are incorporated herein by reference in their entirety.

FIELD

The specification relates to an area of computer technology, specifically, relates to methods, systems, devices and computer-readable mediums for encoding and decoding transform.

BACKGROUND

In digital multimedia technology applications, in order to speed up the transmission of video files, the video files are usually encoded to be compressed before transmission.

A large number of statistics show that there are correlations between adjacent pixels in one image, i.e., the pixel values of these neighboring pixels are similar, and the probability of abrupt changes or "very dissimilar" between these adjacent pixels is very low. Moreover, there are strong correlations between the corresponding pixels between adjacent pixel rows in the same frame of an image. Due to said correlations, the difference between pixel values of adjacent pixels is small, so is the variance of differential signal. Since the variance of the differential signal of the image is much smaller than the variance of the image signal itself, the dynamic range of the quantizer can be reduced, and the number of corresponding quantization layers can be reduced, so that the number of coded bits for each pixel can be significantly reduced without substantially degrading the video quality, which ultimately achieves the purpose of video-compression-coding.

Therefore, in the prior art, the video-compression-coding transmission is performed based on the above properties, and a residual between the predicted pixel value and the actual pixel value is used as the signal for transmission. Further, in the above video-compression-coding process, the residual is transform-coded after being predicted to generate a transformed residual block, to further removing redundant information in the video sequence, thereby realizing high efficient expression of the residual signal and finally outputting the transformed residual block in a bitstream. However, the transform matrices provided in the prior video coding standards are limited, and these transform matrices cannot be suitable for numbers of characteristics of various residual signals, which brings out that the transformed residual block obtained by residual transform cannot meet high efficient expression of the residual signal as expected.

SUMMARY

In view of this, embodiments of the present specification provide methods, systems, devices and computer-readable mediums for encoding and decoding transform, so as to solve the problem of low adaptability of the transform matrices used in the residual transform of the prior art.

Embodiments of the present specification provide the following technical solutions.

An embodiment of the present specification provides a method for encoding transform, which comprises:

performing transform-encoding on a prediction residual block separately using a plurality of transform matrices, to obtain transformed residual blocks;

determining, by a rate-distortion optimization decision, a transform matrix or a combination of transform matrices matching the residual characteristics of the prediction residual block from the plurality of transform matrices, and determining a transformed residual block to be outputted in a bitstream, on the basis of the transformed residual blocks.

In an embodiment, the performing transform-encoding on the prediction residual block separately using the plurality of transform matrices, comprises, performing transform-encoding on the prediction residual block using two different transform matrices.

In an embodiment, the transform matrix or the combination of transform matrices includes a matrix-multiplication-based transform matrix.

In an embodiment, the transform matrix or the combination of transform matrices includes a two-dimensional integer transform matrix based on Discrete Cosine Transform Type II.

In an embodiment, the performing transform-encoding on the prediction residual block separately using the plurality of transform matrices, comprises:

based on the source of the prediction residual block, determining the transform matrix or the combination of transform matrices to be used for transform-encoding, wherein the source of the prediction residual block includes intra-prediction and inter-prediction.

In an embodiment, when determining the transform matrix or the combination of transform matrices matching the residual characteristics of the prediction residual block from the plurality of transform matrices by the rate-distortion optimization decision, the decision is made separately for row transform and column transform.

In an embodiment, when determining the transform matrix or the combination of transform matrices matching the residual characteristics of the prediction residual block from the plurality of transform matrices by the rate-distortion optimization decision, add a transform selection flag corresponding to the determined transform matrix or determined combination of transform matrices to the bitstream.

In an embodiment, when adding a transform selection flag corresponding to the determined transform matrix or determined combination of transform matrices to the bitstream, determine the expression of the transform selection flag based on probabilities of the various transform matrices and/or combinations of transform matrices to be selected.

In an embodiment, as for an intra-predicted residual, the determining the expression of the transform selection flag based on probabilities of the various transform matrices and/or combinations of transform matrices to be selected, specifically comprises:

row transform and column transform each use a two-dimensional integer transform matrix based on Discrete Cosine Transform Type II, and the corresponding transform selection flag is 000;

row transform uses a matrix-multiplication-based transform matrix, column transform uses a two-dimensional integer transform matrix based on Discrete Cosine Transform Type II, and the corresponding transform selection flag is 01;

row transform uses a two-dimensional integer transform matrix based on Discrete Cosine Transform Type II, column transform uses a matrix-multiplication-based transform matrix, and the corresponding transform selection flag is 001;

row transform and column transform each use a matrix-multiplication-based transform matrix, and the corresponding transform selection flag is 1.

In an embodiment, as for an inter-predicted residual, the determining the expression of the transform selection flag based on probabilities of the various transform matrices and/or combinations of transform matrices to be selected, specifically comprises:

row transform and column transform each use a two-dimensional integer transform matrix based on Discrete Cosine Transform Type II, and the corresponding transform selection flag is 1;

row transform uses a matrix-multiplication-based transform matrix, column transform uses a two-dimensional integer transform matrix based on Discrete Cosine Transform Type II, and the corresponding transform selection flag is 01;

row transform uses a two-dimensional integer transform matrix based on Discrete Cosine Transform Type II, column transform uses a matrix-multiplication-based transform matrix, and the corresponding transform selection flag is 000;

row transform and column transform each use a matrix-multiplication-based transform matrix, and the corresponding transform selection flag is 001.

The present application further provides a decoding transform method comprising:

determining a transform matrix or a combination of transform matrices corresponding to the transformed residual block in the bitstream;

performing inverse transform on the transformed residual block using the transform matrix or the combination of transform matrices.

In an embodiment, the transform matrix or the combination of transform matrices includes a matrix-multiplication-based transform matrix.

In an embodiment, wherein the transform matrix or the combination of transform matrices includes a two-dimensional integer transform matrix based on Discrete Cosine Transform Type II.

In an embodiment, the determining the transform matrix or the combination of transform matrices corresponding to the transformed residual block in the bitstream, specifically comprises:

determining the source of the prediction residual block, and determining a transform matrix or a combination of transform matrices corresponding to the transformed residual block in the bitstream based on the source of the prediction residual block, wherein the source of the prediction residual block includes intra-prediction and inter-prediction.

In an embodiment, the determining the transform matrix or the combination of transform matrices corresponding to the transformed residual block in the bitstream, specifically comprises:

acquiring the transform selection flag in the bitstream, and determining a transform matrix or a combination of transform matrices corresponding to the transformed residual block in the bitstream based on the transform selection flag.

The application further provides an encoding transform system comprising:

an encoding transform module, configured to perform transform-encoding on a prediction residual block separately using a plurality of transform matrices, to obtain transformed residual blocks;

a decision module, configured to determine, by a rate-distortion optimization decision, a transform matrix or a combination of transform matrices matching the residual characteristics of the prediction residual block from the plurality of transform matrices, and determine a transformed residual block to be outputted in a bitstream, based on the transformed residual block.

The application further provides a decoding transform system comprising:

a transform matrix determination module, configured to determine a transform matrix or a combination of transform matrices corresponding to the transformed residual block in the bitstream;

a decoding transform module, configured to performing inverse transform on the transformed residual block using the transform matrix or the combination of transform matrices.

The application further provides a computer-readable medium with computer readable instructions that can be executed by a processor to perform the method of the embodiments of the present specification.

The application further provides a device used for information processing at the user side, wherein the device includes a memory for storing computer program instructions and a processor for executing program instructions, and the device is triggered to perform the method of the embodiments of the present specification when the computer program instructions are executed by the processor.

At least one of the technical solutions of the embodiments of the present specification above can achieve the following beneficial effects: compared with the prior art, the method of the embodiments of the present invention performs a residual transform using transform matrices that are more closely matched with the residual characteristic, thereby improving the expression of the residual signal and improving the coding efficiency of the residual block.

BRIEF DESCRIPTION OF THE DRAWINGS

The figures are described herein as a part of the present application to provide a further understanding of the present application. The illustrated embodiments of the present application and descriptions thereof are used to explain the present application but not limitations to the application. In the figures.

DETAILED DESCRIPTION OF EMBODIMENTS

In order to make the purpose, technical solutions and advantages of the present application clearer, the technical solutions of the present application will be clearly and completely described in the following with reference to the specific embodiments of the present application and the corresponding drawings. It is apparent that the described embodiments are only parts of the application, but not all of them. Based on the embodiments of the present application, all other embodiments obtained by those skilled in the art without creative efforts are within the scope of the present application.

In the prior art, when video-compression-coding transmission is performed, a residual between the predicted pixel value and the actual pixel value is used as the signal for transmission. Further, in the above video-compression-coding process, the residual is transform-coded after being predicted to generate a transformed residual block, to further removing redundant information in the video sequence, thereby realizing high efficient expression of the residual signal and finally outputting the transformed residual block in a bitstream. However, the transform matrices provided in the prior video coding standards are limited, and these transform matrices cannot be suitable for numbers of characteristics of various residual signals, which brings out that the transformed residual block obtained by the residual transform cannot meet high efficient expression of the residual signal as expected.

Regarding the technical problems above, encoding transform methods are provided in embodiments of the present specification. In the method of an embodiment of the present specification, the residual block is transformed using a plurality of different transform matrices, and then determine an optimal calculation result. In this way, the problem that a single transform matrix cannot adapt to various characteristics of all residuals can be effectively avoided, and the optimized match of the transform matrices with the residual block characteristics may be reflected in the transform coefficients that finally outputted in the bitstream, thereby improving the expression effects of the residual signals and improving the coding efficiency of the residual blocks.

Figure 1:
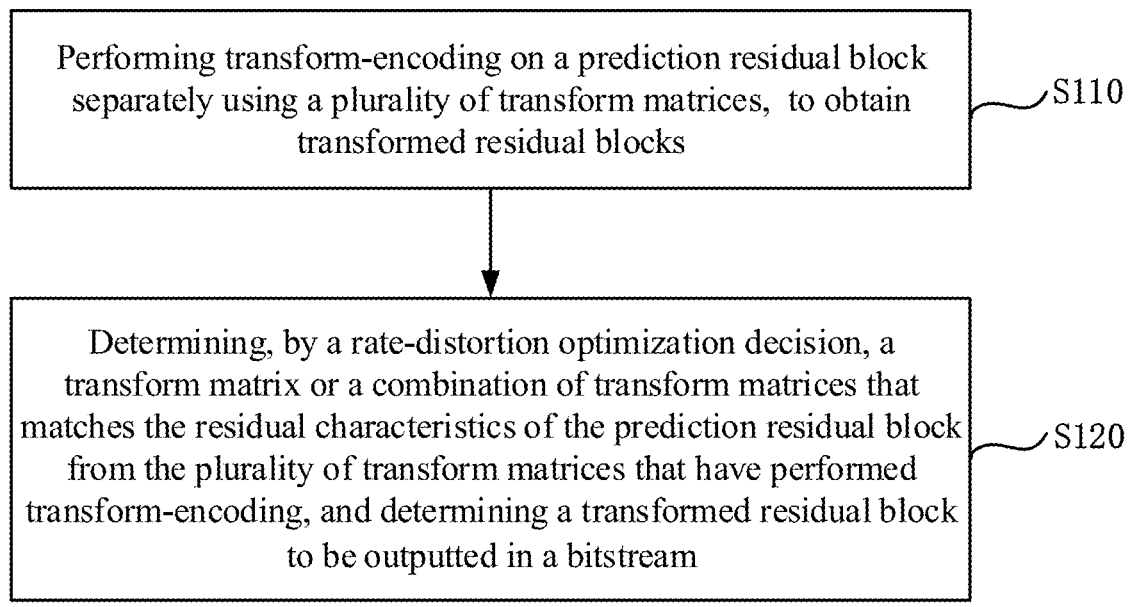
FIGS. 1 and 2 are flowcharts showing the execution of an encoding transform method according to an embodiment of the present specification.

The technical solutions provided by the embodiments of the present specification are described in detail below with reference to the figures. As shown in FIG. 1, in an embodiment, a method includes the following steps:

S110, performing transform-encoding on a prediction residual block separately using a plurality of transform matrices, to obtain transformed residual blocks;

S120, determining, by a rate-distortion optimization decision, a transform matrix or a combination of transform matrices matching the residual characteristics of the prediction residual block from the plurality of transform matrices that have been used for transform-encoding, and determining a transformed residual block to be outputted in a bitstream, based on the obtained transformed residual blocks.

Specifically, in an embodiment, in S110, transform coefficients are generated by performing transform-encoding on the prediction residual block. The transformed residual block may include transform coefficients generated by performing transform-encoding on the prediction residual block using each transform matrix.

Further, in an embodiment, in S120, the rate-distortion optimization decision refers to: comparing the transformed residual blocks corresponding to different transform matrices or combinations of transform matrices based on Rate Distortion Optimization (RDO), to determine a transform matrix or a combination of transform matrices corresponding to the optimal transformed residual block.

Further, in an embodiment, in S120, when determining a transform matrix or a combination of transform matrices matching the residual characteristics of the prediction residual block from the plurality of transform matrices by a rate-distortion optimization decision, add a transform selection flag corresponding to the determined transform matrix or determined combination of transform matrices to the bitstream, so that the decoder can learn the transform matrix used in encoding process according to the transform selection flag in the bitstream.

Further, in an embodiment, in S120, when determining the transform matrix or the combination of transform matrices matching the residual characteristics of the prediction residual block from the plurality of transform matrices by the rate-distortion optimization decision, the decision is made separately for row transform and column transform. Specifically, based on a row transform result and a column transform result, the transformed residual blocks generated by performing transform-encoding on the prediction residual block using the plurality of transform matrices are divided into two groups. Based on the two groups of transformed residual blocks, the transform matrix matching the residual characteristics of the prediction residual block can be determined from the plurality of transform matrices by the rate-distortion optimization decision, and finally the transform matrix for performing row transform and the transform matrix for performing column transform are determined. According to a specific application scenario, the transform matrices finally selected for row transform and for column transform may be the same or different.

Further, in S110, for a coding unit or a transform unit (TU) of the coding unit, the prediction residual block is transform-coded separately with a plurality of transform matrices. Specifically, in an embodiment, residual prediction is made regarding a coding unit (CU) or a prediction unit (PU) of the coding unit, and a prediction residual block is obtained.

Further, in an embodiment, in order to further improve the fitness between the transform matrix and the residual characteristics, a transform matrix for transform-encoding is determined based on the source of the prediction residual block, wherein the source of the prediction residual block includes intra-prediction and inter-prediction.

Specifically, in an embodiment, perform intra-prediction or inter-prediction on the coding unit or the prediction unit of the coding unit, to obtain a prediction residual block. In S110, when performing transform-encoding on the prediction residual block using the plurality of transform matrices, determine the prediction residual block whether corresponds to intra-prediction or corresponds to inter-prediction, and select a corresponding transform matrix (or corresponding transform matrices) based on the determined result.

Specifically, in an embodiment, intra-predicted residuals and inter-predicted residuals are processed using different transform matrices. For example, in an application scenario, pre-configured transform matrices are matrix A1, matrix A2, matrix A3, matrix B1, matrix B2, and matrix B3. Among them, the matrix A1, the matrix A2, and the matrix A3 are used for intra-prediction; the matrix B1, the matrix B2, and the matrix B3 are used for inter-prediction. When performing residual transform, it needs to determine the current residual block is generated whether by intra-prediction or by inter-prediction, in the first place. If the residual block is generated by intra-prediction, the matrix A1, the matrix A2, and the matrix A3 will be respectively used for residual transform to obtain three different transform coefficients; if the residual block is generated by inter-prediction, the residual transform will be performed using the matrix B1, the matrix B2, and the matrix B3, to obtain three different transform coefficients, respectively.

Further, in an embodiment, the intra prediction residual and the inter prediction residual are processed using the same transform matrix (or matrices). For example, in an application scenario, pre-configured transform matrices are matrix A1, matrix A2, and matrix A3. When performing residual transform, no matter the current residual block is generated whether by intra-prediction or by inter-prediction, residual transform is performed using the matrix A1, the matrix A2, and the matrix A3, to obtain three different transform coefficients, respectively.

Further, in an embodiment, some of the transform matrices can be used for intra-predicted residual as well as for inter-predicted residual. Some others of the transform matrices can only be used for intra-predicted residual or inter-predicted residual. For example, in an application scenario, pre-configured transform matrices are matrix A1, matrix A2, matrix A3, matrix B2, and matrix B3. Among them, the matrix A1 is used for intra-prediction and inter-prediction; the matrix A2 and the matrix A3 are used for intra-prediction; the matrix B2 and the matrix B3 are used for inter-prediction. When performing residual transform, it needs to determine the current residual block is generated whether by intra-prediction or by inter-prediction in the first place. If the residual block is generated by intra-prediction, the matrix A1, the matrix A2, and the matrix A3 will be respectively used for residual transform to obtain three different transform coefficients; if the residual block is generated by inter-prediction, the residual transform will be performed using the matrix A1, the matrix B2, and the matrix B3, to obtain three different transform coefficients, respectively.

Further, in an embodiment, in order to reduce the amount of calculation of coding transform, two transform matrices are used. In the process of performing transform-encoding on the prediction residual block using a plurality of transform matrices, the prediction residual block is transform-coded using a first transform matrix and a second transform matrix, to obtain a first transform coefficient and a second transform coefficient, respectively. In the process of determining the transform coefficient to be outputted in the bitstream from the plurality of transform coefficients generated by the rate-distortion optimization decision, determine whether to use the first transform coefficient or the second transform coefficient, by the rate distortion optimization decision.

For example, in an application scenario, pre-configured transform matrices are matrix A1 and matrix A2. When performing residual transform, the residual transform is respectively performed using the matrix A1 and the matrix A2 to obtain two different transform coefficients; in the process of determining the transform coefficient to be outputted in the bitstream from the plurality of transform coefficients generated by the rate-distortion optimization decision, select one from two transform coefficients.

Further, in an embodiment, the transform matrix for performing residual transform includes a matrix-multiplication-based transform matrix (MMT matrix). Specifically, in an embodiment, for a MMT matrix, transform-encoding of the prediction residual block is implemented by matrix multiplication.

Specifically, in an embodiment, the operation of performing residual transform using a MMT matrix is as follows:

$$S = M \cdot R \cdot M^T \quad (1).$$

In formula 1, R represents a prediction residual block, M represents a matrix-multiplication-based transform matrix (MMT), and S represents a transform coefficient generated from transformation. Since matrix multiplication can be accelerated by parallel computation, the difficulty of accelerating and optimizing the residual transform using the MMT matrix can be greatly reduced.

Further, in an embodiment, the transform matrix for performing residual transform includes a two-dimensional integer transform matrix based on Discrete Cosine Transform Type II (DCT-II).

Specifically, in an embodiment, perform residual transform using a matrix-multiplication-based transform matrix (MMT matrix) and a two-dimensional integer transform matrix based on Discrete Cosine Transform Type II (DCT-II).

Figure 2:
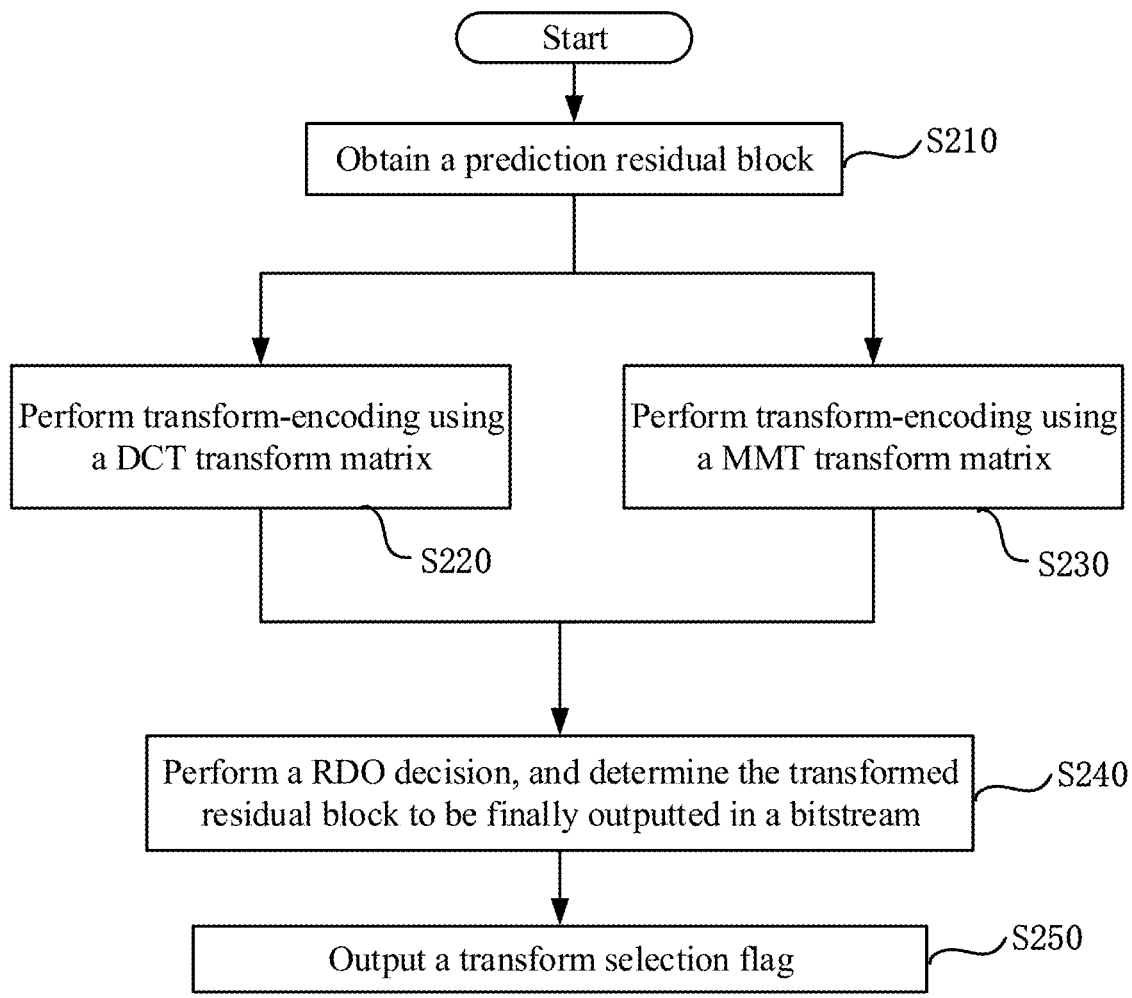

Specifically, as shown in FIG. 2, in an embodiment, the method includes the following steps:

S210, performing intra-prediction or inter-prediction on a current coding unit or a prediction unit of the coding unit to obtain a prediction residual block;

S220, performing transform-encoding on the current coding unit or a transform unit of the coding unit to obtain a transformed residual block, wherein the prediction residual block is transform-coded using a DCT transform matrix;

S230, performing transform-encoding on the current coding unit or a transform unit of the coding unit to obtain a transformed residual block, wherein the prediction residual block is transform-coded using a MMT transform matrix;

S240, based on the transformed residual blocks obtained in S220 and S230, performing rate-distortion optimization decisions separately for row transform and column transform, and determining a transform matrix or a combination of transform matrices corresponding to the transformed residual block to be finally outputted in a bitstream (determining whether the transformed residual block finally outputted in a bitstream is generated using a MMT transform matrix);

S250, adding, to the bitstream to output, a transform selection flag corresponding to the transform matrix or the combination of transform matrices corresponding to the transformed residual block outputted in the bitstream.

In the above process, for a prediction residual block of a coding unit obtained by intra-prediction or inter-prediction, the transform matrix (or matrices) corresponding to the transformed residual block finally outputted in the bitstream may include the following four cases:

(1) DCT+DCT, row transform and column transform of the transformed residual block that are finally outputted in the bitstream are both performed using a DCT transform matrix;

(2) MMT+DCT, row transform of the transformed residual block that is finally outputted in the bitstream is performed using a MMT transform matrix, and column transform thereof is performed using a DCT transform matrix;

(3) DCT+MMT, row transform of the transformed residual block that is finally outputted in the bitstream is performed using a DCT transform matrix, and column transform thereof is performed using a MMT transform matrix;

(4) MMT+MMT, row transform and column transform of the transformed residual block that are finally outputted in the bitstream are both performed using a MMT transform matrix.

Specifically, in an embodiment, the transform selection flag may be a binary flag.

Further, in an embodiment, the expression of the transform selection flag is determined based on probabilities of the various transform matrices and/or combinations of transform matrices to be selected. Specifically, if the probability of being selected is higher, a shorter flag is used, thereby achieving the purpose of saving code rates.

Specifically, in an embodiment, as for an intra-predicted residual, the above four groups of transform matrices may be respectively identified as: the transform selection flag corresponding to DCT+DCT is 000, the transform selection flag corresponding to MMT+DCT is 01, the transform selection flag corresponding to DCT+MMT is 001, and the transform selection flag corresponding to MMT+MMT is 1.

Specifically, in an embodiment, as for an inter-predicted residual, the above four groups of transform matrices may be respectively identified as: the transform selection flag corresponding to DCT+DCT is 1, the transform selection flag corresponding to MMT+DCT is 01, the transform selection flag corresponding to DCT+MMT is 000, and the transform selection flag corresponding to MMT+MMT is 001.

Further, in an embodiment, as for a MMT matrix, an intra-predicted residual and an inter-predicted residual can be processed using different MMT matrices.

Further, in an embodiment, for a MMT matrix used for residual transform, the size of the transform matrix may include 4×4, 8×8, 16×16, 32×32, and 64×64.

Further, in an embodiment, the 64×64 size MMT is not used for inter-predicted residual, that is, the size of the MMT transform matrix used for inter-predicted residual is up to 32×32.

Further, in an embodiment, to avoid floating point calculations, numbers in the MMT matrices used for performing residual transform are converted into integers.

Further, in an embodiment, the MMT matrices used for performing residual transform include MMT matrices that meet different precision requirements. Specifically, in an embodiment, the MMT matrices for performing residual transform include MMT matrices with first-precision and MMT matrices with second-precision, wherein the precisions of the MMT matrices with first-precision are lower than the MMT matrices with second-precision.

Specifically, in an embodiment, the MMT matrices with first-precision used for intra-predicted residuals are shown as below. A 4×4 transform matrix:
{38,60,74,76,},
{77,66,−13,−77,},
{−82,40,68,−58,},
{49,−82,77,−35,}.

A 8×8 transform matrix:
{26,40,53,65,73,78,79,75,},
{−60,−83,−81,−58,−15,32,68,81,},
{79,75,11,−62,−87,−47,30,80,},
{84,28,−71,−70,30,90,18,−75,},
{84,−35,−82,46,71,−59,−58,61,},
{70,−79,−1,80,−73,−14,83,−52,},
{−50,86,−76,29,33,−79,85,−40,},
{27,−55,75,−85,85,−74,55,−23,}.

A 16×16 transform matrix:
{18,26,33,40,47,54,60,66,71,75,79,81,82,81,79,76,},
{−48,−65,−78,−86,−87,−82,−70,−52,−30,−7,17,39,59,72,79,78,},
{67,84,83,67,36,−3,−40,−70,−86,−85,−65,−32,8,47,74,85,},
{82,88,58,7,−47,−83,−85,−53,0,52,83,82,46,−8,−58,−83,},
{88,70,7,−61,−89,−60,7,69,86,50,−22,−80,−83,−34,36,82,},
{86,45,−39,−88,−54,33,88,59,−26,−87,−64,22,85,68,−13,−81,},
{82,16,−71,−72,20,92,39,−64,−83,2,86,57,−47,−90,−14,77,},
{85,−14,−90,−20,83,49,−64,−72,40,85,−15,−90,−10,87,36,−70,},
{88,−51,−84,51,77,−53,−70,55,66,−57,−61,58,59,−63,−56,62,},
{68,−64,−41,80,4,−85,36,72,−69,−45,91,7,−95,35,77,−61,},
{60,−80,1,84,−71,−30,96,−46,−59,91,−19,−70,78,5,−76,47,},
{53,−87,44,40,−90,65,12,−81,84,−13,−67,87,−37,−45,87,−46,},
{45,−88,78,−21,−46,84,−79,32,31,−78,85,−46,−21,79,−90,41,},
{37,−80,96,−80,41,8,−52,78,−78,53,−12,−35,74,−91,79,−33,},
{−24,56,−77,87,−84,72,−51,22,13,−45,71,−86,89,−80,60,−24,},
{10,−25,39,−53,65,−78,88,−94,94,−89,81,−69,55,−41,26,−10,}.

A 32×32 transform matrix:
{16,20,24,28,32,35,38,42,45,49,52,55,58,62,64,67,70,72,74,76,78,79,80,81,82,82,82,81,81,79,78,76,},
{−44,−54,−62,−70,−76,−81,−84,−86,−87,−86,−83,−79,−73,−65,−57,−47,−36,−25,−13,−2,10,22,34,44,54,62,69,74,78,79,79,77,},
{−62,−74,−82,−87,−86,−81,−72,−60,−44,−26,−6,14,34,51,66,78,85,89,87,81,70,56,38,19,−1,−20,−39,−55,−68,−77,−81,−80,},
{−73,−84,−86,−81,−66,−46,−21,8,35,59,77,88,89,81,63,39,11,−18,−44,−66,−81,−89,−86,−75,−56,−32,−5,24,49,68,79,83,},
{−78,−86,−79,−58,−28,8,41,68,85,88,75,50,15,−23,−55,−78,−88,−83,−63,−32,5,42,70,87,90,77,50,16,−22,−55,−78,−87,},
{−87,−89,−67,−28,17,58,83,89,72,38,−6,−49,−79,−90,−77,−43,2,45,77,88,76,44,1,−42,−74,−87,−79,−51,−8,36,69,86,},
{−89,−81,−44,8,58,88,86,54,2,−48,−81,−87,−61,−11,42,80,88,66,19,−34,−74,−88,−70,−27,24,68,89,78,38,−15,−61,−85,},
{−89,−71,−19,43,84,84,46,−13,−67,−89,−69,−17,44,84,84,43,−20,−73,−90,−65,−9,51,85,79,37,−22,−73,−92,−64,−8,51,87,},
{−91,−59,10,72,90,53,−13,−72,−88,−51,16,73,86,48,−20,−75,−86,−46,26,83,86,38,−33,−82,−81,−34,38,87,80,27,−39,−84,},
{−93,−46,36,92,77,3,−69,−89,−43,34,81,70,11,−60,−87,−47,29,84,75,8,−64,−90,−48,29,84,78,11,−66,−89,−47,28,80,},
{−81,−31,50,87,43,−38,−85,−57,23,84,68,−9,−80,−80,−3,78,85,14,−67,−88,−31,58,93,44,−45,−93,−56,32,89,66,−15,−81,},
{−74,−14,63,72,9,−70,−78,1,80,79,−8,−93,−71,25,89,63,−35,−95,−48,46,91,38,−59,−89,−24,64,85,15,−74,−81,0,79,},
{79,2,−73,−64,23,89,41,−59,−87,−11,81,75,−27,−96,−39,64,84,−3,−81,−57,38,89,20,−73,−73,14,89,51,−57,−91,−12,81,},
{99,−16,−105,−46,78,89,−26,−102,−33,81,76,−39,−90,−12,77,55,−45,−79,3,79,40,−57,−70,15,77,32,−61,−67,28,78,19,−64,},
{−77,29,85,3,−81,−35,64,64,−44,−82,19,93,6,−91,−33,75,64,−54,−82,24,91,14,−88,−50,69,79,−38,−93,3,91,33,−72,}, {69,−38,−75,24,76,−8,−74,−11,76,27,−76,−44,75,57,−70,−66,63,78,−52,−90,36,99,−18,−104,2,98,14,−89,−25,82,43,−69,},
{89,−68,−84,67,78,−64,−76,62,74,−61,−70,56,68,−56,−67,58,63,−60,−59,60,56,−63,−55,63,54,−61,−53,62,50,−62,−50,58,},
{−72,69,55,−79,−32,79,19,−80,−4,78,−15,−75,32,72,−54,−60,70,44,−79,−30,86,12,−92,9,94,−26,−95,44,87,−59,−79,72,},
{60,−72,−28,85,−10,−77,34,66,−59,−46,76,25,−91,9,89,48,−66,72,37,−84,−4,90,−37,−79,75,46,−98,1,97,−42,−78,63,},
{61,−84,−9,94,−49,−68,86,23,−97,29,78,−70,−34,86,−18,−72,59,41,−82,−2,89,−54,−54,90,−5,−84,63,37,−88,20,69,−49,},
{−55,87,−18,−78,82,21,−98,49,55,−87,15,72,−68,−23,84,−41,−54,83,−5,−82,69,30,−94,47,56,−91,21,70,−82,−1,78,−49,},
{55,−101,51,52,−107,53,52,−99,43,57,−90,19,64,−72,6,62,−58,−14,73,−51,−24,80,−60,−29,97,−62,−33,90,−64,−23,84,−47,},
{−27,51,−27,−26,57,−37,−23,74,−58,−21,85,−73,−3,82,−96,25,69,−103,52,47,−107,73,17,−90,95,−19,−71,98,−48,−39,86,−45,},
{36,−77,62,0,−64,86,−43,−39,92,−72,−2,78,−101,44,54,−112,81,13,−93,98,−29,−54,89,−63,5,48,−68,50,−5,−49,67,−31,},
{−48,104,−99,34,47,−99,90,−27,−49,89,−73,15,46,−78,64,−15,−36,69,−68,26,31,−67,71,−42,−12,65,−89,67,1,−76,98,−45,},
{−37,84,−96,65,−7,−49,79,−75,36,24,−72,87,−66,14,45,−79,77,−40,−20,73,−93,74,−31,−24,69,−85,66,−14,−51,95,−95,41,},
{31,−75,96,−88,55,−2,−53,88,−94,66,−15,−42,84,−95,77,−34,−21,66,−89,82,−47,−2,45,−72,79,−61,24,20,−59,80,−70,28,},
{−23,57,−81,92,−88,65,−27,−16,51,−72,74,−54,19,22,−62,90,−97,80,−46,4,37,−66,75,−65,37,1,−39,71,−96,105,−86,34,},
{22,−56,81,−97,103,−96,76,−45,9,26,−59,83,−88,78,−60,35,−2,−33,61,−79,84,−79,65,−40,10,21,−48,67,−79,79,−60,23,},
{−3,10,−22,37,−54,75,−93,102,−106,104,−93,74,−54,35,−17,4,3,−5,0,13,−30,49,−69,87,−98,100,−94,84,−72,55,−35,12,},
{9,−23,32,−37,39,−40,36,−26,12,5,−26,49,−71,90,−108,120,−128,128,−120,105,−87,69,−48,25,−3,−14,27,−35,41,−41,33,−13,},
{−9,22,−34,44,−54,65,−74,80,−85,87,−84,77,−68,56,−44,29,−12,−6,24,−43,60,−74,85,−93,98,−97,89,−79,68,−55,37,−14,}.

A 64×64 transform matrix:
{17,19,21,23,25,26,28,30,32,33,35,37,39,41,43,45,46,48,50,51,53,54,56,57,59,61,62,63,65,66,67,68,69,70,71,72,73,74,75,75,76,77,77,78,79,79,80,80,80,81,81,81,81,81,81,80,80,79,79,78,77,76,76,75,},
{−44,−49,−54,−59,−63,−67,−70,−73,−75,−78,−80,−82,−83,−84,−85,−85,−85,−85,−84,−83,−81,−79,−77,−75,−72,−69,−65,−61,−57,−53,−48, −43,−38,−32,−27,−21,−15,−10,−4,2,8,14,20,26,31,37,42,47,52,56,60,65,69,72,75,77,79,81,81,82,82,81,80,78,},
{65,72,77,82,85,87,88,88,87,85,81,77,72,66,59,52,44,35,26,17,8,−1,−10,−20,−30,−38,−47,−55,−62,−68,−74,−78,−82,−85,−86,−87,−86,−85,−81,−78,−73,−67,−61, −53,−45,−36,−26,−16,−6,4,13,23,33,42,51,58,65,71,76,79,81,83,83,82,}, {71,79,84,87,87,85,81,75,67,58,47,34,21,8,−5,−18,−32,−44,−54,−64,−72,−79,−83,−87,−88,−86,−82,−76,−68,−58,−47,−34,−20, −6,9,23,36,48,59,69,77,84,88,90,90,87,82,75,66,55,43,30,16,1,−14,−28,−42,−54,−64,−73,−79,−83,−85,−85,},
{75,82,84,84,79,72,61,47,32,15,−2,−18,−35,−50,−64,−74,−82,−87,−88,−85,−79,−71,−59,−45,−27,−9,11,29,46,62,74,84,89,91,89,83,74,62,47,30,10,−8,−27,−45,−62, −76,−85,−91,−92,−90,−83,−72,−58,−42,−25,−6,13,30,46,59,70,78,82,83,},
{80,87,87,82,71,56,37,16,−7,−30,−51,−68,−81,−89,−91,−88,−80,−66,−48,−28,−6,17,38,58,76,88,92,91,84,72,56,36,12, −11,−32,−51,−67,−79,−86,−87,−84,−75,−60,−41,−19,5,28,49,66,79,87,89,84,73,58,40,19,−2,−23,−43,−60,−73,−80,−82,},
{83,88,84,72,54,32,6,−21,−46,−68,−83,−91,−90,−83,−68,−46,−19,9,35,58,75,87,91,86,74,54,28,0,−27,−52,−70,−83,−88, −85,−74,−58,−36,−10,17,43,66,81,89,89,80,64,40,14,−13,−40,−62,−79,−88,−88,−81,−66,−46,−23,1,27,50,69,80,85,},
{80,83,74,56,31,2,−27,−53,−73,−84,−86,−78,−62,−38,−8,23,52,75,88,91,83,65,40,8,−25,−54,−76,−89,−91,−81,−61,−35,−2,29,58,80,91,91,79,57,28,−4,−36,−64, −83,−92,−88,−74,−51,−21,12,43,68,85,91,85,69,46,18,−13,−41,−63,−77,−83,},
{87,85,70,44,10,−25,−54,−75,−85,−84,−69,−44,−12,21,50,73,85,84,69,44,12,−22,−53,−77,−88,−85,−67,−39,−3,31,59,79, 86,81,63,35,1,−34,−64,−84,−90,−84,−63,−31,7,45,74,90,92,79,53,18,−22,−57,−81,−93,−91,−75,−47,−13,24,58,82,93,},
{96,92,69,33,−10,−51,−80,−95,−92,−72,−38,2,41,74,92,91,72,40,2,−36,−68,−86,−87,−72,−42,−4,36,69,88,88,70,38,−3,−43,−72,−87,−84,−64,−33,5,43,71,85,82,63,30, −8,−44,−71,−84,−79,−58,−25,12,47,74,85,81,61,30,−9,−46,−74,−89,},
{95,85,51,7,−38,−73,−91,−88,−64,−25,20,59,84,92,77,42,−5,−50,−82,−93,−82,−53,−12,33,71,91,89,66,24,−23,−62,−86,−89,−73,−40,4,48,79,90,81,51,10,−35,−71, −88,−83,−56,−16,26,61,81,82,61,26,−14,−51,−74,−82,−71,−44,−6,35,66,85,},
{−86,−72,−36,8,49,75,81,64,28,−15,−53,−77,−79,−59,−21,26,63,81,76,50,11,−32,−67,−83,−78,−49,−2,45,79,88,71,35,−13,−57,−84,−87,−67,−26,22,66,91,91,60,13, −39,−81,−100,−86,−44,9,60,92,96,73,29,−23,−67,−94,−95,−69,−21,31,73,96,},
{−96,−75,−29,25,71,95,86,47,−8,−58,−85,−87,−61,−13,39,78,89,73,31,−20,−62,−85,−79,−48,0,50,83,86,56,7,−42,−77,−85,−67,−27,23,65,89,81,44,−8,−58,−87, −86,−52,0,52,86,85,57,10,−41,−78,−90,−69,−25,28,72,91,82,42,−14,−63,−89,},
{−82,−60,−14,36,73,83,60,14,−40,−77,−84,−60,−14,39,80,92,65,13,−43,−83,−89,−59,−8,44,78,84,57,6,−50,−87,−87,−50, 10,64,89,81,41,−16,−66,−92,−81,−38,23,75,95,75,24,−38,−84,−94,−65,−9,48,87,88,55,1,−54,−87,−85,−51,3,56,87,},
{−92,−61,−1,59,91,81,37,−24,−75,−94,−71,−15,47,90,92,50,−14,−69,−92,−76,−25,38,80,87,58,5,−57,−96,−86,−37,27,78, 92,67,10,−52,−85,−80,−39,20,68,83,60,11,−44,−78,−80,−42,21,73,89,63,6,−53,−84,−75,−33,24,70,84,59,9,−45,−82,},
{−91,−54,10,66,87,63,10,−47,−80,−73,−29,29,70,81,49,−12,−68,−88,−59,−1,55,80,64,22,−32,−73,−79,−44,20,73,87,57,−7,−68,−90,−68,−9,59,91,75,19,−46,−86, −81,−33,35,90,90,41,−27,−85,−95,−52,16,75,97,66,3,−64,−102,−83,−20,49,97,},
{−92,−51,22,83,94,49,−24,−82,−90,−51,18,78,93,57,−11,−75,−100,−62,14,78,93,57,−10,−70,−90,−56,12,72,90,53,−

12,−72,−89,−57,6,71,91,56,−10,−71,−90, −53,16,73,88,47,−24,−78,−81,−38,32,81,77,29,−35,−77,−74,−28,34,78,73,24,−33,−70,},
{−94,−41,37,88,81,20,−50,−90,−71,−4,62,89,57,−10,−71,−83,−41,26,75,79,30,−40,−84,−72,−16,47,90,72,−4,−69,−90,−53, 24,79,81,34,−34,−85,−77,−20,50,87,63,2,−62,−87,−52,20,81,89,31,−48,−92,−76,−8,66,96,62,−15,−81,−92,−42,33,85,},
{−102,−37,57,106,75,−13,−87,−99,−37,50,94,75,8,−69,−98,−57,30,98,91,14,−70,−102,−57,26,85,84,22,−60,−94,55,21, 80,76,22,−45,−86,−58,18,69,67,21,−35,−64,−50,−5,51,73,36,−31,−75,−62,−1,61,79,41,−29,−81,−77,−12,63,87,47,−25,−75,},
{−73,−16,47,73,36,−30,−66,−52,3,58,67,28,−36,−83,−56,19,84,80,7,−72,−95,−45,45,100,73,−9,−97,−101,−4,84,99,34, −62,−102,−58,31,90,76,4,−63,−81,−36,33,70,63,6,−69,−81,−23,52,87,51,−27,−85,−77,−9,73,96,41,−48,−100,−68,21,90,},
{−70,−20,49,76,36,−31,−74,−55,15,75,67,−4,−73,−79,−8,76,89,17,−71,−101,−41,61,109,60,−47,−108,−66,34,101,72,−16, −85,−77,−9,68,90,27,−56,−87,−46,39,89,57,−23,−87,−74,12,85,75,3,−71,−80,−17,61,82,30,−50,−82,−44,32,85,60,−14,−77,},
{−69,−11,58,71,18,−49,−79,−38,43,91,54,−40,−93,−58,33,96,58,−40,−95,−59,39,104,62,−44,−106,−60,56,110,35,−63,−96, −35,69,100,24,−71,−92,−27,59,91,39,−53,−97,−43,54,98,41,−54,−88,−39,43,82,39,−40,−75,−41,27,72,45,−21,−59,−49,6,56,},
{31 9,−13,10,23,19,−8,−46,−27,25,56,34,−41,−68,−22,44,72,12,−64,−53,9,53,54,−22,−66,−31,26,72,33,−64,−71,−7,67,85, −96,−71,18,103,84,−37,−111,−79,33,134,71,−67,−117,−57,69,125,36,−77,−107,−32,78,106,16,−79,−92,−16,89,88,−5,−82,},
{137,−7,−128,−110,26,140,92,−49,−137,−84,66,133,61,−68,−126,−40,91,105,6,−99,−91,33,103,52,−52,−92,−16,69,52, −8,−54,−44,36,68,10,−56,−62,11,71,34,−27,−54,−26,36,43,5,−28,−37,0,40,21,−10,−28,−17,15,29,4,−13,−18,−10,18,18,−3,−15,},
{−62,9,64,45,−27,−73,−28,48,74,12,−76,−70,28,101,38,−84,−89,30,105,39,−83,−94,21,105,54,−67,−107,−1,106,71,−46, −110,−33,85,92,−25,−100,−45,61,94,5,−86,−61,31,71,35,−42,−69,−16,58,62,−7,−67,−46,22,67,43,−33,−74,−28,47,79,12,−71,},
{−66,11,75,41,−48,−75,−7,69,58,−26,−78,−27,60,65,−23,−74,−15,64,45,−42,−67,8,75,36,−58,−70,20,76,22,−50,−55,2,63, 54,−31,−98,−27,101,82,−52,−116,−30,102,105,−45,−126,−29,90,85,−24,−93,−41,60,86,−4,−83,−62,30,90,47,−59,−97,−16,89,},
{−78,23,89,33,−70,−80,23,94,40,−72,−90,25,105,34,−78,−85,39,99,5,−92,−53,65,85,−21,−93,−21,74,57,−40,−75,−5,78, 48,−53,−83,8,98,33,−74,−66,35,87,8,−98,−37,80,60,−35,−78,−13,72,55,−40,−82,−14,77,67,−27,−86,−35,55,75,9,−67,},
{92,−35,−103,−19,88,65,−48,−93,3,100,37,−82,−69,45,84,−5,−86,−28,77,57,−52,−80,20,92,8,−79,−31,54,51,−33,−69,8, 82,25,−73,−68,52,93,−12,−96,−43,69,88,−24,−103,−25,91,62,−51,−89,4,91,45,−63,−79,9,84,43,−59,−71,22,70,16,−50,},
{−56,31,60,−7,−56,−19,41,39,−22,−53,−1,60,26,−50,−50,29,71,−3,−80,−25,76,64,−69,−88,51,96,−30,−99,12,96,20,−97, −54,91,78,−77,−89,57,91,−25,−95,−12,89,53,−76,−83,64,88,−29,−96,−10,92,49,−64,−74,17,79,39,−59,−84,14,106,40,−91,},
{77,−45,−85,10,84,31,−73,−71,54,97,−31,−106,2,107,19,−103,−32,105,42,−103,−61,99,80,−88,−97,65,111,−40,−115,
13,119,19,−119,−49,101,69,−77,−71,53,63,−36,−52,24,48,−16,−46,8,48,−4,−51,1,53,3,−48,−14,39,21,−20,−24,10,22,−16,−23,25,},
{47,−27,−55,12,59,3,−56,−19,50,35,−45,−40,35,35,−27,−31,31,29,−37,−33,42,44,−46,−57,48,65,−51,−72,53,80,−42,−88, 18,98,0,−105,−6,101,15,−95,−27,86,47,−74,−63,61,82,−55,−96,40,110,−13,−118,−27,113,68,−90,−100,47,121,1,−125,−50,101,},
{84,−61,−92,43,97,−14,−98,−14,99,29,−93,−43,79,54,−68,−61,62,63,−52,−67,49,61,−43,−57,38,48,−35,−39,41,33,−41, −32,38,32,−39,−31,44,23,−39,−21,39,26,−42,−45,57,54,−73,−52,76,65,−70,−92,58,113,−36,−125,13,126,12,−122,−36,115,62,−95,},
{−107,98,102,−92,−107,85,115,−81,−117,77,112,−67,−109,63,100,−62,−91,61,80,−63,−66,71,48,−71,−39,67,29,−62,−16,56,5,−46,1,40,−1,−44,4,51,0,−58,−4,59,9,−66,−4,71,−11,−64,11,62,0,−64,−18,68,32,−64,−42,55,47,−55,−42,53,34,−41,},
{65,−72,−47,75,34,−75,−27,72,21,−71,−10,72,0,−81,13,91,−33,−88,44,86,−63,−78,85,58,−108,−32,125,3,−123,19,118, −31,−111,45,92,−57,−63,58,46,−52,−48,52,52,−54,−57,66,51,−74,−37,68,36,−60,−40,56,42,−53,−45,50,51,−54,−55,58,59,−62,},
{−59,73,27,−78,0,72,−12,−65,23,57,−32,−53,39,52,−54,−40,73,22,−82,−5,90,−30,−80,59,62,−83,−39,101,11,−105,8,106, −27,−105,55,84,−79,−43,73,24,−66,−22,67,30,−88,−17,116,−22,−110,39,93,−41,−80,43,75,−48,−74,48,78,−52,−75,61,72,−70,},
{−60,72,38,−80,−19,79,5,−76,12,75,−36,−69,61,46,−79,−5,74,−17,−76,37,75,−73,−46,99,−4,−89,48,58,−85,−17,95,−6,−107,41,93,−74,−54,88,18,−89,6,83,−26,−75,39,78,−68,−58,86,35,−91,−11,86,−6,−85,18,88,−28,−90,41,84,−52,−71,61,},
{63,−88,−17,94,−18,−85,37,76,−59,−58,83,23,−83,8,67,−34,−40,48,17,−63,15,68,−60,−39,83,−4,−79,44,49,−58,−28,66,6, −85,48,74,−98,−26,108,−21,−94,47,74,−54,−66,72,51,−100,−10,103,−35,−85,69,59,−87,−37,100,7,−102,24,88,−44,−75,61,},
{−64,90,14,−91,27,68,−50,−41,63,11,−67,18,62,−47,−37,61,3,−55,20,48,−50,−21,65,−10,−73,55,43,−78,1,68,−32,−49, 57,16,−65,28,50,−62,−28,89,−18,−82,58,60,−94,−15,104,−36,−88,82,50,−110,0,118,−55,−99,98,59,−123,−4,121,−47,−94,73,},
{56,−88,2,90,−49,−68,82,32,−97,16,81,−52,−48,72,11,−78,30,64,−61,−38,84,−14,−73,66,21,−78,44,41,−83,12,79,−49,−50,80,−11,−79,72,48,−111,10,108,−68,−68,102,5,−98,60,57,−94,−9,97,−37,−74,79,26,−94,29,69,−65,−24,71,−19,−45,31,},
{43,−73,11,72,−64,−32,84,−20,−67,59,30,−74,10,63,−40,−44,68,9,−75,26,63,−68,−10,72,−55,−22,81,−53,−37,82,−14,−76,61,42,−100,30,83,−102,−9,122,−76,−77,125,−10,−103,79,27,−85,35,57,−71,−17,88,−43,−62,92,0,−94,58,53,−86,3,77,−48,},
{−48,87,−23,−75,78,29,−94,30,67,−74,−5,79,−58,−41,83,−13,−73,55,48,−83,2,81,−67,−17,79,−61,−18,78,−57,−26,75,−24, −56,62,4,−70,56,43,−94,19,76,−68,−17,78,−52,−34,93,−58,−43,101,−48,−67,107,−9,−103,85,37,−110,45,73,−97,5,79,−50,},
{49,−82,22,61,−79,3,89,−75,−32,88,−36,−40,53,2,−47,21,46,−60,−6,76,−68,−18,101,−76,−42,110,−70,−33,120,−89,44, 125,−76,−41,109,−72,−27,102,−77,−20,82,−45,−32,52,−7,−37,33,4,−43,31,36,−73,26,63,−93,15,88,−93,−3,88,−82,−8,81,−48,},
{−40,94,−69,−27,83,−50,−5,32,−22,−11,5,40,−23,−55,77,−15,−63,97,−43,−68,113,−57,−16,67,−79,33,21,−58,86,−

51,−45, 98,−72,7,72,−100,47,23,−73,101,−45,−77,123,−53,−43,109,−105,9,92,−105,50,40,−103,61,27,−71,69,−14,−60,63,−11,−35,55,−29,},
{−30,63,−36,−39,86,−46,−45,87,−36,−45,70,−24,−37,48, 0,−40,18,30,−39,−8,58,−56,−9,91,−99,−9,132,−135,10, 126,−136, 12,116,−142,55,74,−137,93,18,−111,95,17,−101, 73,9,−54,51,−20,−15,27,−14,−9,23,−2,−24,5,29,−29,−6, 38,−32,−15,52,−29,},
{10,−20,12,10,−36,37,5,−53,51,−1,−45,52,−19,−32,55,−27,−14,35,−25,−2,19,−12,−5,11,10,−32,20,26,−62,37,35,−80,53, 29,−87,80,−25,−61,104,−41,−68,102,−27,−81,113,−40,−74,125,−58,−70,138,−77,−53,136,−96,−37,135,−98,−35,126,−96,−19,101,−58,},
{46,−88,54,30,−79,27,62,−80,5,87,−97,−12,129,−108,−31, 145,−124,−16,143,−138,14,111,−135,52,57,−105,79,−18,−42, 72,−47,−11,59,−71,35,20,−51,50,−29,−8,45,−46,10, 30,−48,32,7,−42,53,−30,−15,52,−47,1,39,−46,26,5,−29, 35,−11,−29,45,−21,},
{−41,86,−60,−26,97,−80,−9,93,−96,14,82,−104,27,76,−101,24,73,−97,29,69,−114,67,33,−104,96,−22,−60,93,−71, 6,58, −69,38,5,−38,40,−21,7,−1,−12,28,−31,14,24,−61,52,−3,−49,82,−58,−16,80,−88,35,43,−92,76,−2,−79,103,−45,−56,108,−54,},
{−50,115,−103,14,86,−115,44,69,−119,67,32,−99,79,13,−96,97,−23,−61,89,−46,−27,73,−66,24,24,−46,39,−19,−1, 21,−36  36,−19,−10,34,−39,31,−17,−12,50,−62,29,23,−66, 69,−18,−60,107,−84,−5,94,−111,48,48,−108,94,−24,−57, 97,−73,2,67,−83,36,},
{30,−73,74,−23,−48,93,−75,−4,84,−103,50,38,−92,78,−14,−57,87,−56,−6,54,−64,46,−15,−27,62,−63,32,12,−55, 71,−47,−3 51,−80,68,−16,−42,84,−87,40,34,−87,82,−15,−66,102,−80,18,58,−104,84,−9,−63,90,−74,27,30,−79,96,−62,−12,90,−117,55,},
{−43,112,−135,84,12,−100,130,−75,−27,113,−133,74,28,−107,108,−44,−34,95,−110,65,3,−52,72,−66,37,9,−57,90,−86, 43,21,−73,85,−53,−5,58,−86,76,−33,−21,51,−44,6,34,−48,36,−7,−19,25,−11,−5,10,−10,15,−25,30,−17,−19,51,−48, 2,65,−92,44,},
{24,−61,74,−54,14,34,−74,81,−49,−11,69,−97,79,−15,−59, 106,−109,58,21,−90,117,−93,38,30,−92,122,−102,39,36,−96, 115,−83,18,50,−91,96,−70,27,24,−67,74,−40,−6,44,−59,40,−7,−23,42,−50,38,−7,−28,52,−55,25,27,−67,73,−38,−24,74,−78,33,},
{−35,90,−116,102,−51,−10,51,−64,50,−10,−35,68,−80,69,−40,−1,39,−56,46,−11,−35,73,−92,83,−52,6,41,−69,72,−43,−12, 67,−104,114,−93,44,17,−65,82,−67,19,49,−97,103,−73, 13,48,−78,69,−25,−36,87,−103,79,−35,−13,49,−58,40,5,−55,92,−92,39,},
{−27,71,−97,95,−66,21,26,−60,70,−50,7,43,−79,87,−65,25, 17,−49,53,−30,−4,37,−60,69,−68,56,−32,4,25,−50,58,−42, 11, 30,−68,100,−117,98,−44,−22,74,−96,78,−24,−38,87,−112,104,−64,5,52,−88,93,−66,12,52,−98,109,−86,33,28,−71,76,−32,},
{9,−29,54,−73,80,−73,54,−26,−2,19,−20,−1,36,−69,87,−84, 67,−45,20,3,−13,6,10,−35,60,−73,76,−75,71,−57,30,2,−28, 34, −24,−1,39,−86,126,−136,113,−61,−3,52,−72,57,−15,−39,88,−119,126,−105,58,1,−47,63,−47,8,42,−89,114,−111, 80,−29,},
{20,−48,53,−30,−16,71,−115,135,−129,99,−56,8,31,−47, 36,2,−53,96,−121,124,−109,86,−59,27,2,−15,11,2,−23,55,−86, 103,−104,93,−78,60,−39,18,−3,0,−9,27,−51,74,−90, 92,−80,59,−33,9,5,−7,−4,26,−49,69,−85,83,−66,47,−29,12, 2,−3,},
{−24,64,−98,120,−117,83,−29,−27,70,−92,88,−62,19,32,−74,99,−103,78,−34,−11,47,−70,76,−64,36,5,−40,62,−81,

89,−74, 42,−1,−38,63,−77,80,−66,42,−9,−29,65,−90,91,−70,33,5,−32,53,−62,53,−25,−12,51,−77,81,−65,38,−5,−35, 70,−92,85,−35,},
{17,−41,57,−64,59,−42,16,17,−52,81,−101,103,−84,46,−2,−36,62,−69,61,−36,0,38,−75,103,−120,123,−107,79,−45, 6,33, −58,65,−61,46,−26,2,30,−64,90,−106,105,−86,49,−13,−16,41,−59,64,−51,22,13,−49,80,−96,91,−68,32,8,−44, 72,−86,73,−29,},
{−19,50,−75,91,−98,91,−70,38,−1,−34,67,−94,103,−94, 78,−49,8,29,−56,76,−81,73,−59,35,−4,−25,51,−71,87,−93, 79,−50 18,12,−36,57,−75,84,−86,71,−42,8,35,−77,97,−97, 90,−79,58,−23,−13,38,−55,60,−53,35,−8,−24,56,−79,91,−88,65,−24,},
{14,−42,66,−82,92,−95,88,−69,45,−15,−19,57,−89,107,−112,106,−91,68,−37,6,22,−49,69,−77,77,−64,43,−22,−3, 32,−62 81,−93,104,−107,101,−92,78,−60,36,−7,−24,54,−74,79,−72,61,−47,25,2,−26,44,−59,67,−69,58,−38,12,15,−42,58,−57,43,−16,},
{5,−14,24,−34,43,−52,60,−62,59,−55,47,−34,17,1,−16,27,−35,44,−43,35,−26,14,3,−20,36,−51,60,−65,71,−75,68,−53, 35, −16,1,10,−26,53,−84,104,−117,118,−102,71,−33,−3, 39,−72,98,−114,118,−110,91,−66,32,12,−53,83,−102,112,−115,105,−78,29,},
{−11,28,−44,58,−72,84,−90,89,−82,69,−49,24,5,−34,61,−86,113,−136,147,−143,133,−123,111,−90,66,−42,18,5,−27, 46, −58,62,−63,63,−60,58,−56,51,−46,37,−25,11,4,−17, 30,−40,49,−58,59,−53,45,−34,19,−4,−13,30,−44,53,−55, 47,−40,37,−29,11,},
{4,−11,21,−33,47,−60,73,−85,94,−102,110,−115,110,−98, 82,−62,45,−30,12,10,−30,49,−68,84,−95,101,−106,111,−117, 120,−112,93,−73,52,−33,21,−9,−6,17,−29,41,−51,56,−58,59,−58,55,−52,49,−40,28,−15,3,7,−18,32,−45,50,−49, 49,−49,44,−32,13,},
{−5,13,−22,32,−44,55,−64,71,−76,80,−82,84,−84,80,−76, 70,−63,61,−58,51,−45,39,−35,34,−29,20,−15,12,−8,2,8,−19,32, −43,50,−55,62,−69,75,−82,95,−107,111,−111,111,−111,112,−114,111,−99,85,−67,45,−26,9,9,−27,40,−47,50,−48,44,−34,13,},
{2,−7,11,−13,15,−16,16,−16,17,−19,22,−23,23,−23,20,−17, 18,−18,17,−20,24,−24,23,−27,32,−38,45,−51,57,−64,68,−65, 64,−63,58,−51,46,−44,45,−47,50,−47,41,−29,15,0,−16, 32,−52,72,−93,115,−135,149,−156,156,−153,142,−123, 101,−79,58,−37,13,}.

Specifically, in an embodiment, the MMT matrices with second-precision used for intra-predicted residuals are shown as below. A 4×4 transform matrix:
{151,241,297,305,},
{306,265,−53,−309,},
{−327,161,274,−233,},
{197,−328,310,−140,}.

A 8×8 transform matrix:
{103,161,212,258,293,314,318,301,},
{−240,−330,−325,−230,−60,128,272,324,},
{316,299,46,−246,−348,−188,119,319,},
{338,111,−283,−281,120,359,71,−300,},
{336,−140,−329,183,286,−235,−231,246,},
{278,−317,−5,321,−293,−56,334,−207,},
{−199,344,−306,116,132,−315,342,−160,},
{108,−221,299,−339,338,−296,220,−92,}.

A 16×16 transform matrix:
{73,103,132,161,189,216,240,263,284,301,315,324,327, 325,317,303,},
{−190,−260,−310,−342,−347,−327,−280,−210,−122,−28, 68,158,234,289,316,313,},
{270,335,333,267,144,−10,−160,−279,−343,−339,−261,−128,34,188,297,340,}, {330,350,233,29,−186,−330,−339,−211,0,207,332,327, 182,−33,−231,−333,},
{350,282,28,−244,−354,−240,27,275,346,199,−87,− 319,−332,−135,145,330,},
{345,181,−157,−354,−216,133,353,237,−103,−349,− 257,87,339,273,−50,−322,},
{327,65,−282,−288,82,367,156,−256,−332,10,343,229,− 187,−360,−55,308,},
{338,−56,−362,−79,330,198,−255,−287,160,342,−59,− 361,−41,348,144,−281,},
{350,−202,−337,206,308,−213,−279,219,263,−227,− 245,230,236,−251,−223,249,},
{271,−255,−164,322,18,−342,143,288,−274,−178,364, 27,−381,140,309,−244,},
{239,−320,2,338,−284,−119,385,−186,−234,364,−76,− 282,312,20,−304,188,},
{210,−349,175,162,−361,261,46,−325,337,−50,−267, 350,−150,−179,350,−182,},
{180,−352,311,−83,−183,336,−314,130,123,−312,340,− 185,−83,318,−361,163,},
{149,−321,382,−320,166,32,−210,311,−313,214,−48,− 140,297,−366,316,−133,},
{−96,224,−308,347,−338,286,−203,86,51,−181,283,− 342,356,−321,241,−97,},
{39,−98,157,−212,262,−311,354,−376,376,−357,323,− 276,221,−163,104,−39,}.

A 32×32 transform matrix:
{65,81,96,111,126,140,153,167,181,195,208,221,234,246, 258,268,278,287,295,303,310,316,320,324,326,327,327, 325,322,317,311,302,},
{−175,−215,−249,−280,−305,−324,−338,−345,−347,− 343,−333,−316,−292,−262,−226,−187,−145,−100,−53,−6, 42,89,134,177,216,250,277,298,311,318,316,307,},
{−249,−298,−330,−346,−344,−325,−290,−239,−175,− 103,−25,55,134,206,265,311,341,354,347,322,279,222, 154,78,−3,−82,−155,−220,−273,−309,−324,−321,},
{−290,−336,−346,−323,−265,−184,−83,30,141,237,310, 351,355,322,253,158,45,−70,−177,−266,−326,−355,−345,− 299,−223,−128,−18,95,197,273,318,332,},
{−313,−344,−315,−234,−110,32,164,272,338,351,300,199, 62,−91,−222,−314,−353,−333,−253,−130,20,166,279,349, 359,307,202,62,−89,−221,−311,−349,},
{−349,−356,−268,−113,69,230,332,355,289,153,−25,− 195,−315,−359,−308,−173,8,182,306,353,303,176,4,− 168,−295, −349,−318,−206,−33,144,277,344,},
{−358,−325,−176,33,232,354,344,215,10,−194,−325,− 350,−243,−45,168,321,353,264,77,−136,−297,−354,−279,− 108, 95,271,354,312,150,−60,−244,−341,},
{−355,−283,−75,173,335,338,186,−53,−267,−357,−274,− 66,176,335,338,174,−80,−291,−362,−260,−34,205,339,316, 150, −86,−293,−367,−254,−30,204,348,},
{−363,−236,38,289,358,214,−50,−287,−351,−206,65,292, 342,190,−80,−302,−345,−183,105,330,344,152,−132,−330, −326,−134,151,350,319,108,−156,−336,},
{−373,−185,144,369,308,11,−276,−357,−173,135,323,281, 45,−240,−347,−187,116,337,298,33,−256,−361,−192,118, 335,314,46,−263,−354,−188,111,321,},
{−325,−123,201,346,170,−151,−339,−230,93,337,273,− 37,−319,−321,−12,310,340,57,−269,−354,−123,233,373, 176, −179,−372,−225,126,356,264,−59,−325,},
{−298,−57,250,290,38,−281,−314,5,320,317,−32,−371,− 284,98,354,253,−138,−379,−191,185,365,151,−235,−357,− 96, 256,339,58,−296,−325,1,316,},
{316,7,−291,−255,91,357,165,−238,−348,−43,325,301,− 110,−385,−157,257,335,−12,−323,−227,152,354,81,−292,− 291, 57,356,204,−228,−364,−46,324,}, {395,−64,−420,−184,313,354,−105,−409,−130,325,303,− 157,−358,−49,307,222,−180,−314,14,316,160,−226,−278, 62, 309,127,−245,−268,111,311,75,−255,},
{−309,117,342,13,−325,−138,257,255,−177,−328,77,370, 22,−362,−130,301,254,−217,−328,97,362,54,−352,−199, 275, 315,−151,−371,14,364,130,−287,},
{275,−151,−299,97,303,−33,−297,−43,302,106,−303,−177, 299,229,−282,−265,252,314,−207,−361,144,398,−72,−416, 7, 390,55,−356,−101,329,173,−278,},
{358,−271,−337,269,313,−257,−305,250,295,−242,−278, 222,271,−223,−266,234,252,−240,−234,242,225,−250,− 221, 251,216,−242,−211,248,201,−250,−202,232,},
{−288,277,218,−316,−128,316,75,−318,−17,314,−58,−300, 128,288,−218,−240,281,178,−316,−119,346,47,−369,34, 376, −103,−379,177,348,−237,−315,289,},
{239,−287,−111,340,−40,−307,138,262,−235,−183,305, 99,−363,34,358,−194,−266,289,147,−336,−16,360,−146,− 316, 300,184,−393,5,387,−166,−313,252,},
{245,−337,−36,374,−196,−271,345,91,−388,117,312,− 282,−134,342,−73,−287,235,162,−326,−8,355,−215,−217, 360,−22, −335,252,148,−351,81,275,−194,},
{−220,350,−71,−314,329,85,−390,196,221,−347,61,287,− 271,−90,334,−162,−216,330,−20,−328,275,118,−375,189, 224, −366,84,280,−328,−3,311,−195,},
{220,−402,206,208,−426,212,208,−398,171,230,−358,78, 255,−286,25,248,−232,−58,293,−206,−96,318,−242,−116, 387, −249,−131,360,−255,−91,337,−190,},
{−109,205,−107,−104,227,−148,−90,296,−231,−83,339,− 292,−13,329,−384,100,276,−412,206,187,−430,294,68,− 362, 380,−76,−285,390,−191,−154,346,−181,},
{145,−308,250,1,−256,343,−173,−154,367,−287,−6,310,− 404,175,217,−446,323,50,−373,393,−117,−218,356,−252, 20, 193,−272,200,−18,−194,268,−124,},
{−192,416,−395,137,189,−394,362,−109,−194,357,−290, 59,183,−312,258,−61,−144,276,−273,104,125,−269,283,− 168, −46,259,−358,267,6,−303,392,−181,},
{−148,336,−385,261,−26,−195,315,−299,143,98,−288, 346,−264,56,179,−314,307,−159,−79,294,−372,294,−122,− 95,275, −339,265,−55,−202,380,−380,165,},
{126,−300,383,−353,220,−9,−211,353,−375,266,−62,−169, 336,−380,306,−134,−82,265,−358,329,−190,−7,180,−290, 315, −243,97,80,−236,319,−280,114,},
{−92,228,−323,369,−352,259,−107,−63,205,−289,296,− 215,77,88,−250,360,−388,320,−186,16,150,−263,302,−259, 148, 3,−154,284,−385,420,−342,138,},
{86,−222,322,−387,412,−383,303,−179,38,104,−238,332,− 353,311,−241,140,−7,−131,245,−318,338,−316,261,−162, 39, 86,−191,267,−316,314,−240,92,},
{−10,41,−90,147,−217,302,−371,407,−425,416,−372,298,− 215,139,−69,17,14,−21,−1,52,−121,196,−274,347,−394, 401, −376,335,−286,222,−138,48,},
{38,−92,129,−147,158,−162,145,−102,46,22,−104,198,− 286,361,−430,482,−510,511,−482,422,−349,275,−193, 100,−12, −58,106,−139,162,−165,133,−54,},
{−35,90,−136,176,−217,261,−296,320,−339,347,−338, 310,−270,225,−175,117,−50,−22,97,−173,241,−296,341,− 373,392, −386,357,−315,272,−218,146,−54,}.

A 64×64 transform matrix:
{67,75,83,90,98,106,113,119,126,133,141,148,156,163, 171,178,185,192,199,206,212,218,223,230,236,242,248, 253,259,264,269,274,278,282,286,289,292,296,298,302, 305,307,310,312,315,317,319,321,321,323,323,324,324, 323,323,322,320,318,315,313,309,306,302,298,},
{−176,−197,−217,−235,−251,−266,−279,−292,−302,− 312,−321,−328,−333,−338,−339,−340,−339,−338,−336,− 332,−325, −317,−310,−301,−288,−275,−260,−244,−229,− 211,−192,−172,−150,−129,−106,−83,−61,−39,−17,6,31,54, 79,102,126,148, 170,189,208,225,242,258,274,287,299,
308,316,322,326,327,327,324,320,314,},
{260,287,308,326,338,346,351,352,347,338,325,309,289,
264,237,208,175,141,105,70,33,−4,−42,−80,−118,−154,
−188,−220,−248,−274,−294,−313,−328,−339,−345,−347,−
345,−338,−326,−311,−291,−269,−242,−213,−180,−144,−
104,−63, −23,15,53,93,133,169,203,233,260,284,302,316,
326,332,333,327,},
{285,315,335,347,347,339,324,300,268,230,186,137,86,
34,−20,−73,−127,−174,−217,−255,−287,−314,−334,−347,−
351, −344,−328,−304,−272,−232,−188,−137,−80,−22,35,
91,145,193,237,276,309,334,351,359,359,347,328,301,264,
220, 172,121,63,4,−56,−113,−168,−216,−257,−291,−317,−
333,−341,−338,},
{301,326,337,334,317,288,243,188,126,61,−6,−74,−139,−
202,−255,−297,−330,−348,−351,−340,−317,−284,−237,−
178, −109,−35, 43,116,186,247,295,334,357,365,357,333,
296,248,189,119, 41,−34,−108,−179,−247,−303,−341,−
363,−368,−360,−332,−290,−233,−169,−99,−25,50,120,184,
238,280,311,328,330,},
{319,346,349,327,283,222,147,62,−29,−120,−203,−274,−
325,−356,−365,−353,−318,−263,−192,−112,−22,68,154,
234, 304,351,369,364,338,288,223,142,49,−43,−128,−
206,−269,−316,−343,−350,−335,−299,−238,−162,−75,19,
112,195,264, 317,349,356,336,294,232,158,76,−9,−93,−
172,−240,−293,−322,−328,},
{334,351,334,289,216,126,24,−84,−186,−271,−330,−362,−
362,−333,−271,−183,−75,36,139,230,300,347,363,346,294,
215,113,1,−110,−207,−281,−333,−352,−339,−298,−232,−
143,−40,69,173,263,325,358,357,321,254,162,57,−54,−
158, −247,−314,−351,−354,−324,−265,−183,−93,6,108,
202,276,322,339,},
{322,331,294,225,124,6,−110,−214,−290,−336,−344,−
313,−247,−150,−33,91,208,301,353,365,332,260,159,32,−
102, −217,−303,−355,−365,−324,−245,−139,−10,117,230,
320,363,364,316,227,110,−17,−145,−256,−332,−367,−
354,−297, −204,−85,47,171,273,341,362,340,277,186,71,−
50,−164,−253,−309,−332,},
{349,342,280,175,41,−99,−217,−302,−341,−335,−278,−
176,−49,82,200,292,340,335,276,176, 49,−89,−214,−308,−
353,−339,−268,−154,−12,123,237,316,342,323,253,142,5,−
138,−256,−334,−362,−335,−251,−124, 29,181,296,361,368,
318,213,71,−86,−228,−325,−372,−363,−300,−188,−52,98,
234,326,371,},
{383,369,277,132,−41,−203,−321,−379,−368,−287,−151,8,
164,295,367,364,288,161,8,−144,−271,−345,−348,−289,
−169,−16,143,276,351,351,278,151,−13,−171,−290,−350,−
335,−257,−133, 20,173,286,341,330,253,122,−34,−176,−
284,−336,−316,−233,−101,48,187,294,341,324,246,119,−
34,−185,−297,−355,},
{378,339,206,27,−152,−291,−364,−352,−255,−101,79,238,
337,367,309,169,−19,−199,−327,−372,−329,−212,−46,133,
286,365,358,264,96,−91,−247,−343,−354,−292,−161,16,
190,316,362,325,204,39,−142,−285,−351,−332,−223,−65,
105, 246,324,328,244,102,−57,−205,−298,−327,−285,−
176,−24,139,265,340,},
{−345,−287,−142,33,196,302,323,255,113,−59,−213,−
309,−315,−236,−83,103,254,326,306,202, 43,−130,−269,−
332,−311,−194,−9,179,315,350,283,139,−52,−229,−335,−
350,−267,−105,87,262,365,362,241,52,−157, −325,−401,−
345,−176,35,238,369,383,290,114,−94,−269,−376,−380,−
276,−84,122,290,386,},
{−383,−300,−117,99,283,379,342,189,−32,−231,−339,−
347,−242,−53,156,310,357,292,124,−81,−249,−341,−314,−
191, 2,202,331,344,224,29,−166,−307,−339,−266,−107,91, 262,355,323,177,−33,−233,−349,−342,−209,−2,210,343,
340,227, 39,−163,−311,−358,−275,−99,113,288,364,326,
166,−57,−251,−355,},
{−329,−241,−57,145,291,333,240,55,−158,−310,−336,−
241,−56,157,320,368,259,51,−171,−333,−357,−237,−33,
177,313, 335,230,25,−200,−348,−347,−202,39,255,356,
325,165,−64,−263,−368,−324,−152,91,299,381,300,95,−
151,−335,−378, −261,−36,193,347,354,219,4,−217,−348,−
339,−206,13,223,349,},
{−367,−244,−2,236,364,325,148,−97,−301,−377,−284,−61,
188,359,368,200,−57,−275,−369,−303,−99,154,321,349,
234, 20,−230,−383,−344,−147,107,312,369,267,42,−209,−
340,−321,−157, 82,272,332,239,44,−176,−313,−321,−167,
83,290,356,250,24,−213,−335,−301,−131,96,280,336,237,
37,−181,−326,},
{−363,−215,40,264,348,253,39,−189,−320,−292,−115,117,
280,323,197,−48,−272,−350,−238, −4,219,321,256,87,−
126,−291,−316,−175,79,290,347,227,−29,−271,−360,−
270,−34,238,365,298,75,−186,−345,−325, −134,139,359,
361,162,−109,−341,−380,−208,65,299,387,266,11,−255,−
407,−333,−81,194,389,},
{−368,−202,87,331,374,194,−97,−329,−362,−204,73,313,
372,229,−44,−302,−399,−248,57,310,371,229,−39,−282,−
359, −223,47,290,359,213,−49,−290,−357,−228,26,284,
365,224,−39,−282,−361,−211,64,291,350,187,−97,−314,−
325,−152, 127,324,310,116,−140,−309,−295,−113,136,310,
291,94,−134,−278,},
{−375,−162,150,353,323,80,−202,−360,−283,−14,250,355,
228,−42,−283,−334,−164,104,299,316,121,−162,−337,−
286, −63,187,360,289,−15,−275,−361,−210,95,317,325,
137,−135,−341,−308,−78,199,346,251,7,−248,−349,−210,
79,322,354, 125,−192,−367,−303,−30,266,384,248,−59,−
324,−366,−170,133,340,},
{−408,−147,227,423,299,−51,−348,−395,−148,202,377,
300,34,−274,−394,−229,121,392,363,57,−281,−407,−228,
104, 340,337,88,−240,−374,−221,82,320,306,88,−181,−
344,−234,70,277,267, 84,−141,−255,−201,−18,204,291,
142,−122,−298,−248,−5,243,318,165,−114,−323,−307,−47,
253,347,188,−99,−301,},
{−292,−65,188,291,142,−119,−264,−210,12,231,268,113,−
145,−330,−224,77,335,321,29,−288,−381,−181,178,398,
293, −37,−390,−406,−14,338,396,137,−247,−409,−232,
123,362,304,16,−253,−325,−144,131,280,251,23,−276,−
325,−94, 206,346,203,−109,−339,−309,−37,292,382,162,−
190,−400,−273,86,359,},
{−279,−81,196,302,143,−124,−295,−219,60,299,270,−16,−
291,−317,−31,306,355,68,−286,−403,−162,245,436,239,−
190, −431,−266,136,402,288,−65,−340,−307,−37,273,361,
108,−223,−350,−184,157,356,227,−91,−346,−295,48,341,
298, 13,−283,−321,−67,244,328,121,−201,−330,−176,128,
341,238,−56,−306,},
{−275,−44,233,282,72,−196,−317,−152,173,364,217,−
159,−370,−233,132,385,230,−160,−381,−236,154,418,
249,−177, −424,−239,226,441,141,−253,−382,−140,278,
402,97,−286,−367,−110,235,364,157,−211,−389,−174,215,
394,164,−215, −352,−156,172,328,156,−161,−299,−163,
108,288,180,−83,−236,−196,26,224,},
{−35,−54,41,93,75,−32,−183,−109,100,226,134,−163,−
271,−87,174,287,49,−255,−210,35,214,216,−89,−263,−
126,105, 287,130,−255,−285,−28,266,341,−36,−383,−285,
73,411,335,−149,−445,−315,132,535,286,−270,−466,−230,
275,501, 145,−307,−427,−129,313,423,65,−316,−370,−64,
356,353,−21,−329,},
{546,−27,−512,−439,102,560,368,−195,−549,−335,263,
530,244,−271,−505,−159,363,419,22,−397,−362,131,413,
208, −207,−368,−65,274,207,−32,−217,−176,144,273,39,−

223,-249,46,286,135,-109,-214,-102,145,173,19,-111,-148, -1,162,85,-41,-112,-69,60,117,16,-53,-70,-39,70,73,-13,-60,},

{-248,35,257,182,-110,-292,-112,192,296,48,-305,-281,113,402,153,-337,-356,119,418,157,-333,-376,86,421,217, -266,-430,-4,425,285,-186,-440,-130,342,367,-102,-399,-179,246,376,19,-344,-245,124,285,140,-168,-277,-62, 232,248,-26,-270,-182,87,266,174,-133,-297,-113,187,315,48,-284,},

{-264,46,300,164,-190,-300,-29,277,231,-105,-313,-108,240,260,-90,-296,-59,254,181,-169,-267,31,301,145,-232, -280,78,304,87,-201,-219,9,254,215,-124,-393,-108,404,329,-207,-464,-119,407,421,-180,-506,-116,360,340, -97,-372,-166,239,345,-16,-334,-249,119,361,187,-238,-388,-65,355,},

{-312,93,355,134,-278,-319,92,377,159,-286,-359,101,420,137,-312,-338,156,395,21,-370,-212,259,340,-84,-372, -85,295,228,-161,-299,-18,313,192,-213,-332,33,390,131,-296,-264,140,346,31,-394,-148,319,240,-141,-313, -51,289,218,-159,-327,-56,306,267,-109,-344,-140,222,299,35,-267,},

{366,-142,-413,-77,350,260,-190,-373,12,399,149,-329,-274,180,334,-21,-345,-111,306,227,-209,-321,81,366,31, -315,-122,218,204,-130,-276,30,327,101,-292,-270,209,371,-47,-383,-173,277,350,-97,-413,-98,365,247,-206, -355,16,365,181,-250,-316,37,334,173,-238,-282,87,280,63,-199,},

{-224,125,241,-27,-224,-74,165,154,-89,-212,-3,238,105,-202,-199,115,285,-14,-322,-102,305,257,-275,-352,203, 385,-119,-397,47,385,81,-387,-218,366,313,-307,-358,229,365,-100,-379,-49,355,211,-303,-331,255,350,-118, -384,-39,366,196,-257,-296,68,316,156,-235,-336,57,422,158,-362,},

{309,-182,-339,41,338,126,-293,-285,214,390,-122,-424,8,430,75,-413,-128,421,167,-413,-242,394,320,-354,-389,261,443,-159,-459,53,476,77,-474,-198,403,277,-309,-282,213,250,-144,-208,97,193,-63,-185, 32,192,-17,-205,5,211,14,-193,-58,154,85,-80,-95,40,88,-66,-92,99,},

{187,-107,-219,48,235,11,-222,-74,199,138,-180,-158,140,139,-108,-123,123,116,-150,-131,169,175,-185,-227, 193,258,-202,-289,213,318,-168,-351,71,391,-1,-421,-24,403,61,-381,-110,343,187,-296,-252,243,327,-222,-386,160,438,-51,-471,-109,452,273,-358,-399,190,482,5,-498,-201,402,},

{336,-245,-369,172,390,-58,-392,-54,395,118,-370,-170,317,217,-273,-244,248,252,-209,-267,197,244,-174,-227, 151,194,-139,-154,163,130,-165,-126,150,126,-155,-123,176,92,-157,-83,157,104,-167,-181,228,216,-292,-209,305,260,-281,-369,233,454,-146,-500,53,503,48,-489,-146,460,246,-380,},

{-430,391,406,-368,-427,342,458,-323,-468,308,449,-267,-434,252,401,-250,-363,246,320,-253,-263,283,193,-286,-155,268,115,-249,-65,223,21,-184,2,158,-2,-178,14,204,-2,-232,-17,236,37,-263,-14,285,-43,-257,43,247,1, -255,-74,273,129,-254,-168,221,186,-219,-167,212,138,-163,},

{262,-286,-186,302,138,-301,-108,289,82,-286,-38,286,2,-325,53,365,-133,-352,177,344,-250,-312,342,231,-432, -128,500,11,-494,76,472,-124,-446,179,366,-228,-254,230,186,-206,-190,207,207,-217,-229,262,204,-298,-146, 273,143,-241,-160,226,169,-211,-179,201,203,-217,-220,232,238,-247,},

{-236,293,107,-311,0,289,-50,-261,93,228,-127,-213,156,208,-217,-162,291,87,-327,-19,362,-120,-320,236,247, -330,-155,404,45,-421,33,424,-108,-420,220,338,-318,-173,292, 97,-265,-88,269,121,-353,-67,464,-89,-439,158,371,-164,-320,173,299,-191,-296,191,310,-210,-299,242,289,-280,},

{-241,287,152,-318,-76,314,19,-303,47,301,-144,-274,243,185,-315,-19,297,-67,-306,147,299,-290,-184,394,-14, -355,194,232,-340,-67,381,-24,-427,163,371,-295,-215,353,73,-355, 22,332,-103,-302,154,310,-273,-232,343,139,-363,-42,343,-23,-340,72,352,-114,-361,164,336,-210,-284,244,},

{252,-351,-69,376,-72,-340,148,303,-238,-234,333,92,-331,31,268,-134,-160,191,70,-250, 61,271,-241,-158,333,-15,-315,177,195,-231,-112,264,23,-340,193,297,-393,-103,433,-82,-375,187,298,-217,-265, 290,206,-401,-40,411,-139,-341,277,234,-346,-147,400,29,-407,98,351,-175,-301,246,},

{-255,361,58,-366,110,273,-200,-163,252,45,-270,71,248,-188,-146,245,14,-219,80,193,-201,-84,259,-40,-291, 222,172,-311,4,273,-126,-198,228,63,-262,111,200,-247,-112,358,-74,-327,233,240,-378,-58,417,-146,-354,330, 198,-439,-1,474,-220,-398,392,237,-494,-15,485,-189,-375,291,},

{223,-352,6,360,-198,-273,328,128,-389,63,325,-208,-192,287,46,-312,119,256,-244,-152,338,-57,-291,262,84, -313,178,163,-332,50,317,-195,-201,319,-45,-316,289,191,-443,38,432,-274,-272,407,21,-393,241,227,-378,-34, 386,-149,-294,316,105,-375,116,276,-261,-97,284,-75,-178,124,},

{173,-293,46,289,-256,-129,336,-79,-270,234,120,-295,42,250,-159,-175,274,36,-301,104,254,-271,-40,289,-221, -89,323,-211,-147,327,-58,-304,245,170,-399,118,331,-408,-35,490,-305,-307,501,-41,-413,317,109,-338,139, 228,-284,-68,352,-170,-247,367,-2,-375,233,214,-342,12,307,-192,},

{-193,346,-93,-302,312,115,-378,121,268,-294,-19,315,-232,-164,333,-53,-292,221,191,-332, 7,325,-267,-70,315,-244,-73,312,-227,-103,301,-96,-225,246,15,-278,222,170,-374, 75,302,-273,-66,310,-208,-134,371,-234,-172,406,-191,-268,428,-36,-413,339,148,-441,180, 293,-389,21,317,-198,},

{197,-329,88,242,-315,11,358,-301,-129,352,-146,-160,211,7,-189,82,184,-240,-25,305,-273,-72,404,-303,-166, 441,-280,-133,479,-356,-175,500,-303,-165,435,-289,-107,408,-308,-80,327,-182,-127,209,-27,-147,132,17,-170, 123,144,-292,102,253,-370,61,352,-371,-12,351,-328,-32,325,-194,},

{-161,375,-276,-110,333,-201,-20,129,-89,-43,20,161,-91,-220,307,-59,-253,386,-172,-272,454,-230,-64,269,-314, 132,85,-231,342,-205,-181,391,-289,26,286,-398,187,90,-290,403,-178,-310,491,-214,-171,436,-420,35,367,-420, 200,159,-413,246,110,-282,275,-55,-238,253,-45,-140,219,-115,},

{-121,253,-142,-156,343,-185,-178,347,-144,-181,281,-97,-146,191,1,-160,73,121,-157,-31,231,-222,-34,364,-394, -36,529,-540,40,504,-544,47,464,-568,219,296,-548,372,73,-445,382,67,-406,293,38,-217,203,-82,-59,108,-56, -35,93,-8,-97,22,118,-117,-25,153,-126,-59,207,-118,},

{41,-80,48,40,-143,149,19,-213,202,-2,-180,209,-77,-129,219,-108,-57,139,-101,-9, 75,-49,-21,42,39,-129,78,105,-248,149,142,-321,211,117,-349,320,-101,-243,418,-164,-271,409,-108,-325,454, -159,-294,499,-233,-279,552,-308,-214,543,-384,-146,541,-393,-139,505,-383,-76,402,-231,},

{182,-353,215,122,-315,110,247,-319,21,347,-388,-50,515,-433,-123,581,-496,-64,574,-553,58,442,-540,208,227, -420,315,-73,-169,289,-189,-45,238,-282,139,78,-

202,199,−116,−31,179,−183,39,120,−194,130,28,−167,
210,−120,  −59,209,−188,3,157,−184,105,21,−117,139,−
45,−115,180,−85,},
{−164,345,−241,−106,390,−322,−35,370,−386,55,328,−
415,109,306,−402,94,291,−387,118,275,−458,268,134,−
416,383,  −88,−240,374,−284,24,232,−275,151,21,−152,
160,−85,29,−3,−47,111,−125,58,96,−245,207,−13,−198,
328,−231,−63,  319,−350,140,172,−370,306,−9,−315,413,−
180,−224,431,−217,},
{−200,458,−414,56,342,−458,176,274,−475,269,128,−395,
315,53,−384,389,−91,−244,356,−184,−110,292,−266,94,
95, −182,155,−75,−4,83,−145,144,−77,−39,135,−155,124,−
67,−49,202,−248,117,93,−263,278,−72,−239,426,−334,−
20,377,  −446,193,191,−431,376,−96,−228,389,−290,9,
268,−332,146,},
{121,−294,296,−91,−191,372,−301,−14,336,−413,198,
151,−367,312,−58,−227,350,−226,−23,216,−256,183,−61,−
107, 247,−250,128,50,−219,283,−187,−13,203,−318,271,−
62,−170,336,−350,159,135,−350,329,−59,−265,410,−321,
70,230,  −414,334,−35,−250,359,−294,109,121,−317,386,−
247,−47,358,−468,222,},
{−172,447,−539,338,47,−401,521,−298,−110,451,−532,
298,113,−427,431,−176,−138,381,−441,260,11,−208,287,−
262,  147,35,−230,359,−345,172,85,−290,341,−212,−18,
233,−343,304,−134,−84,206,−176,23,137,−194,144,−28,−
77, 99,−45,−18, 41,−40,59,−100,120,−66,−78,203,−192,7,
258,−367,176,},
{97,−245,295,−217,58,134,−295,326,−196,−46,276,−387,
317,−60,−237,425,−435,233,84,−360,468,−373,151,121,−
370, 490,−407,156,144,−383,460,−332,73,198,−364,382,−
281,107,97,−267,295,−159,−25,177,−235,161,−27,−90,
168,−200, 153,−27,−111,207,−220,99,108,−267,293,−153,−
97,295,−311,132,},
{−141,359,−466,410,−206,−39,203,−256,200,−42,−140,
272,−321,277,−160,−4,155,−226,183,−42,−138,293,−368,
332,  −208,24,164,−277,287,−171,−48,267,−415,456,−373,
176,70,−259,327,−267,74,196,−388,413,−291,  52,192,−
313,276,−100,−144,350,−414,315,−139,−54,197,−233,158,
19,−222,370,−367,155,},
{−108,285,−387,379,−264,85,102,−240,279,−199,27,173,−
316,346,−259,102,66,−196,214,−120,−15,146,−240,275,−
271,  224,−128,16,99,−202,230,−167,42,122,−274,398,−
466,392,−175,−87,297,−384,311,−98,−152,346,−448,417,−
257,  21,210,−354,372,−262,48,207,−391,436,−346,133,
110,−286,302,−128,},
{35,−116,214,−293,321,−292,214,−103,−7,78,−81,−5,
145,−275,349,−334,268,−180,78,12,−52,25,41,−140,239,−
291,305,  −300,284,−230,121,9,−111,137,−94,−5,157,−344,
505,−544,453,−246,−10,208,−289,227,−58,−155,353,−477,
505,−419,  230,5,−189,252,−190,34,169,−357,456,−444,
319,−115,},
{81,−191,212,−121,−62,284,−462,540,−515,398,−225,32,
124,−189,144,9,−211,383,−483,495,−437,344,−237,109,
7,−61,  45,10,−93,219,−346,414,−417,371,−311,240,−154,
72,−10,−2,−38,110,−204,297,−360,369,−320,235,−131,36,
21,−27,−17,105,−196,278,−338,333,−266,187,−117,47,8,−
12,},
{−94,255,−393,481,−467,331,−115,−107,282,−368,351,−
247,75,129,−295,394,−411,313,−134,−46,188,−279,303,−
255,  145,18,−161,248,−323,355,−296,166,−2,−152,251,−
308,319,−265,166,−34,−116,262,−362,366,−280,133,20,−
129,210,  −249,212,−102,−50,205,−308,323,−260,153,−
19,−140,279,−368,341,−142,},
{67,−165,229,−255,236,−169,64,69,−207,324,−403,412,−
334,182,−8,−144,248,−278,244,−145,  1,153,−301,410,−
479,494,−429,315,−182,26,131,−231,261,−242,184,−105, 10,118,−255,361,−423,422,−343,197,−52,  −63,165,−235,
254,−204,90,53,−198,319,−384,365,−272,129,30,−175,
288,−344,292,−116,},
{−74,199,−299,364,−390,365,−282,151,−5,−136,268,−376,
412,−378,314,−196,32,115,−224,302,−322,292,−237,138,−
15,  −101,205,−285,346,−371,315,−200,73,49,−144,230,−
299,338,−344,282,−168,31,139,−306,388,−386,359,−318,
232,  −91,−51,154,−218,238,−213,140,−33,−97,224,−317,
365,−353,259,−95,},
{58,−167,263,−327,367,−380,352,−277,180,−62,−78,228,−
356,428,−449,422,−363,273,−149,22,87,−194,274,−308,
308,  −256,174,−86,−12,130,−247,323,−374,415,−428,
405,−367,314,−242,145,−30,−95,215,−295,315,−287,244,−
190,100,  10,−102,178,−235,268,−275,234,−152,50,62,−
167,231,−229,171,−64,},
{19,−55,94,−136,171,−208,241,−249,237,−218,190,−138,
70,2,−66,106,−142,175,−172,138,−103,55,14,−81,143,−
203,  240,−259,284,−299,273,−211,139,−66,5,39,−104,
214,−334,416,−466,471,−409,282,−133,−10,155,−288,
393,−455,472, −441,364,−264,129,48,−213,330,−407,449,−
458,420,−311,118,},
{−43,113,−175,232,−286,335,−360,357,−329,274,−195,95,
19,−135,242,−344,452,−545,586,−572,533,−493,444,−360,
263,−168,73,20,−110,184,−230,246,−252,250,−241,231,−
222,205,−183,148,−102,45,16,−69,119,−159,196,−230,235,
−210,180,−134,76,−18,−51,120,−175,212,−221,189,−159,
148,−116,44,},
{15,−46,85,−134,187,−240,292,−339,375,−407,440,−459,
441,−392,326,−250,180,−118,46,38,−120,195,−271,334,−
379, 404,−423,445,−470,482,−446,372,−291,206,−133,84,−
34,−22,70,−115,164,−204,223,−231,237,−233,219,−208,
195,  −159,111,−62,14,29,−74,128,−178,198,−197,196,−
194,176,−129,50,},
{−21,54,−88,130,−175,218,−255,283,−305,320,−329,338,−
337,321,−306,279,−252,245,−230,205,−178,154,−142,138,
−115,78,−58,47,−32,8,30,−75,127,−173,202,−222,247,−
277,300,−328,381,−428,445,−445,446,−446,449,−458,
442,−395,  340,−268,182,−106,38,36,−108,159,−190,199,−
192,177,−137,53,},
{9,−27,42,−53,61,−62,63,−65,67,−76,90,−91,91,−91,79,−
68,71,−73,70,−80,97,−96,  93,−110,130,−153,181,−206,
228,−256,270,−262,258,−253,232,−205,185,−177,179,−
190,198,−189,164,−116,58,0,−63,  129,−207,290,−373,
462,−539,594,−625,625,−611,567,−493,405,−316,232,−
148,54,}.

Specifically, in an embodiment, the MMT matrices with first-precision used for inter-predicted residuals are shown as below. A 4×4 transform matrix:
  {−7,−54,−95,−67,},
  {−76,−82,9,62,},
  {−80,18,53,−82,},
  {64,−80,67,−37,}.
A 8×8 transform matrix:
  {12,28,47,73,93,91,73,45,},
  {−49,−80,−91,−64,−7,49,73,61,},
  {76,84,27,−57,−83,−6,67,68,},
  {66,45,−55,−79,47,82,−22,−88,},
  {75,5,−76,14,75,−61,−56,93,},
  {97,−64,−49,89,−52,−3,55,−55,},
  {−61,96,−79,30,24,−68,75,−43,},
  {34,−57,63,−69,77,−84,73,−36,}.
A 16×16 transform matrix:
  {24,34,40,54,70,81,89,90,86,83,79,69,55,46,33,16,},
  {−16,−36,−57,−78,−90,−83,−60,−22,15,47,76,88,87,77, 63,49,},
  {56,79,90,81,49,−3,−55,−89,−87,−61,−22,31,69,76,59, 36,}, {77,87,67,23,−31,−75,−77,−30,38,82,81,29,−39,−77,−82,−62,},
{62,56,36,0,−56,−70,−6,71,82,16,−66,−103,−62,32,94,94,},
{85,72,13,−73,−102,1,89,70,−27,−87,−44,43,68,18,−49,−70,},
{93,47,−50,−93,−5,98,43,−67,−72,25,68,1,−74,−50,42,86,},
{76,19,−77,−61,63,49,−55,−51,54,67,−51,−87,48,94,−18,−94,},
{74,4,−91,−9,106,−27,−80,60,60,−86,−39,88,16,−78,−11,56,},
{55,−24,−70,48,43,−78,15,75,−85,−37,98,−20,−85,73,48,−85,},
{101,−84,−53,99,−24,−52,71,−19,−49,71,−28,−41,83,−33,−66,68,},
{75,−95,2,69,−78,52,8,−75,82,−27,−39,78,−60,−11,86,−74,},
{51,−86,57,3,−48,90,−92,48,22,−78,90,−60,5,53,−85,54,},
{27,−56,61,−38,4,32,−68,84,−75,50,−10,−36,79,−109,111,−61,},
{−38,79,−86,72,−49,20,7,−34,57,−76,89,−92,86,−72,53,−24,},
{33,−70,88,−89,86,−88,87,−74,64,−63,58,−45,33,−24,19,−9,}.

A 32×32 transform matrix:
{−16,−18,−21,−25,−27,−31,−38,−45,−53,−58,−63,−68,−74,−78,−82,−85,−86,−87,−87,−86,−84,−83,−83,−80,−76,−72,−68,−60, −51,−46,−42,−34,},
{−52,−64,−75,−87,−93,−97,−97,−93,−91,−88,−83,−70,−57,−45,−32,−16,1,15,25,33,41,50,57,62,67,69,67,65,59,51,45,39,},
{−41,−50,−55,−60,−64,−65,−59,−48,−35,−19,0,21,40,57,71,83,88,87,79,63,45,25,−1,−29,−55,−76,−90,−96,−99,−97,−88,−72,},
{−46,−59,−70,−80,−79,−67,−43,−8,24,53,73,85,92,87,70,43,13,−21,−49,−75,−90,−96,−90,−70,−38,−4,25,54,70,73,71,58,},
{−63,−80,−86,−77,−53,−19,19,54,84,97,90,63,27,−16,−52,−78,−88,−76,−52,−24,13,49,75,88,79,52,16,−21,−55,−76,−80,−72,},
{−40,−48,−51,−44,−25,6,36,62,79,71,40,−5,−52,−83,−88,−64,−21,31,79,101,88,46,−12,−64,−96,−100,−77,−28,31,77,98,92,},
{−86,−97,−82,−38,23,81,110,100,61,0,−62,−100,−95,−54,16,76,100,77,27,−29,−68,−73,−52,−15,24,47,52,39,7,−25,−41,−43,},
{−79,−81,−51,5,58,81,61,14,−33,−67,−62,−30,23,72,85,52,−13,−78,−97,−61,4,69,92,69,8,−57,−97,−85,−29,37,87,94,},
{−80,−82,−43,18,79,97,56,−22,−87,−87,−27,56,96,68,−7,−77,−87,−35,40,84,72,11,−54,−82,−54,7,59,80,55,0,−57,−78,},
{−64,−53,−7,44,75,54,−13,−77,−87,−14,76,98,39,−51,−99,−62,36,103,78,−14,−90,−89,−18,56,82,43,−29,−77,−65,−10,54,78,},
{−95,−69,15,103,101,5,−97,−109,−13,95,95,6,−73,−80,−5,75,61,−17,−64,−48,14,61,51,−8,−60,−56,2,64,70,21,−38,−68,},
{56,40,−17,−66,−46,23,66,40,−45,−69,−4,63,56,−22,−75,−40,59,89,4,−97,−77,34,99,68,−37,−114,−65,57,114,60,−44,−94,},
{80,38,−50,−88,−26,67,73,−15,−94,−45,70,95,−14,−108,−40,86,82,−37,−97,−24,75,68,−19,−79,−42,49,73,8,−67,−58,16,67,},
{−115,−30,93,93,−19,−109,−25,110,60,−73,−71,36,80,0,−78,−32,57,53,−35,−73,2,73,37,−55,−67,15,75,30,−55,−68,9,69,},
{50,8,−45,−41,21,64,−3,−75,−9,78,18,−81,−33,84,47,−89,−51,80,54,−65,−65,42,82,−6,−99,−43,84,86,−51,−119,−1,108,},
{71,−3,−75,−28,64,48,−61,−66,67,72,−77,−79,96,73,−108,−55,92,53,−70,−54,47,60,−29,−72,16,80,−6,−80,−8,73,22,−62,},
{−60,9,66,9,−65,−19,71,18,−88,4,92,−17,−98,34,90,−67,−54,94,15,−100,8,93,−5,−94,5,91,7,−90,−17,97,28,−82,},
{55,−11,−62,0,56,−1,−58,11,63,−45,−46,67,16,−81,28,76,−79,−43,107,6,−115,18,107,−35,−98,48,85,−65,−72,83,58,−83,},
{98,−41,−100,32,97,−40,−83,61,50,−80,1,72,−48,−38,73,−13,−67,65,27,−89,28,81,−72,−54,97,7,−85,26,68,−52,−49,61,},
{−75,45,78,−49,−53,63,26,−71,15,58,−54,−22,79,−44,−45,103,−56,−56,109,−40,−73,93,9,−99,58,59,−87,−5,85,−48,−58,63,},
{63,−48,−42,52,15,−58,11,62,−51,−36,93,−47,−51,96,−56,−28,95,−93,9,92,−103,2,99,−76,−32,91,−41,−51,85,−16,−75,58,},
{−60,45,48,−63,−21,92,−47,−71,123,−58,−47,108,−71,−17,82,−85,28,51,−87,54,8,−57,59,−3,−62,70,−4,−70,74,12,−90,58,},
{84,−94,−40,126,−68,−61,110,−46,−45,92,−77,4,68,−77,30,27,−63,62,−26,−24,53,−55,18,41,−68,38,25,−76,59,23,−93,64,},
{84,−126,27,111,−148,59,53,−110,90,−30,−38,73,−61,29,5,−42,57,−41,9,23,−51,54,−15,−39,61,−32,−24,60,−42,−23,76,−49,},
{−52,103,−83,11,71,−114,96,−32,−38,86,−93,55,7,−53,72,−64,28,21,−65,81,−54,−4,66,−84,47,22,−73,66,−14,−51,79,−43,},
{53,−93,77,−27,−27,59,−68,52,−18,−19,46,−63,62,−46,11,31,−67,79,−66,22,42,−94,99,−48,−27,89,−105,56,25,−94,115,−62,},
{48,−97,97,−66,21,24,−51,59,−62,59,−33,−7,39,−54,52,−34,9,22,−56,72,−60,18,39,−86,104,−86,32,36,−96,122,−111,55,},
{−34,69,−79,62,−30,−9,42,−63,77,−87,76,−38,−10,58,−92,110,−115,105,−80,44,−3,−39,65,−74,65,−42,1,41,−62,67,−57,27,},
{23,−49,62,−68,62,−46,29,−2,−26,61,−95,120,−132,121,−95,59,−20,−18,53,−81,94,−94,72,−33,1,24,−41,44,−37,27,−15,5,},
{−32,67,−81,80,−71,59,−44,23,−2,−11,20,−34,44,−51,61,−70,78,−87,95,−99,102,−96,77,−46,9,30,−63,80,−82,71,−53,25,},
{−28,59,−76,88,−100,114,−121,115,−101,92,−82,71,−60,52,−44,40,−40,42,−46,51,−53,49,−43,39,−38,40,−35,27,−17,9,−4,2,},
{12,−26,32,−33,40,−46,45,−40,33,−28,25,−20,14,−9,4,0,−5,9,−14,26,−46,67,−87,103,−118,134,−139,132,−111,85,−57,24,}.

Specifically, in an embodiment, the MMT matrices with second-precision used for inter-predicted residuals are shown as below. A 4×4 transform matrix:
{−27,−216,−378,−267,},
{−303,−329,35,248,},
{−322,72,214,−328,},
{257,−319,268,−148,}.

A 8×8 transform matrix:
{49,112,190,292,372,364,291,180,},
{−197,−321,−365,−256,−28,197,291,244,},
{305,334,107,−228,−332,−25,267,271,}, {263,180,−219,−317,190,328,−88,−350,},
{301,21,−305,54,301,−242,−226,370,},
{390,−257,−196,357,−209,−11,220,−220,},
{−243,382,−317,122,96,−270,301,−174,},
{137,−228,251,−275,308,−337,292,−144,}.

A 16×16 transform matrix:
{97,136,161,216,280,323,355,361,343,333,318,276,219, 185,133,64,},
{−65,−143,−228,−313,−359,−331,−239,−89,59,188,303, 353,346,306,250,196,},
{225,317,362,324,195,−11,−221,−357,−348,−243,−88, 123,274,302,237,145,},
{306,346,269,94,−125,−301,−309,−120,150,328,326, 115,−157,−309,−328,−246,},
{247,226,144,1,−225,−279,−24,284,327,65,−262,−410,− 246,128,375,374,},
{341,287,53,−294,−408,2,356,281,−106,−347,−175,174, 270,72,−198,−280,},
{372,190,−200,−372,−19,392,174,−267,−287,99,271,3,− 296,−201,170,343,},
{302,74,−308,−242,251,194,−218,−206,217,268,−205,− 347,191,378,−74,−376,},
{295,15,−365,−38,424,−109,−318,239,239,−346,−154, 350,65,−311,−42,226,},
{220,−95,−279,193,172,−314,58,298,−342,−148,394,− 82,−341,292,193,−341,},
{402,−337,−213,398,−95,−210,283,−75,−197,284,− 112,−166,332,−131,−265,272,},
{302,−380,7,276,−311,210,32,−300,328,−110,−156, 311,−239,−46,344,−296,},
{203,−344,226,14,−191,362,−368,190,87,−310,359,− 242,19,214,−338,217,},
{109,−225,243,−153,17,127,−270,336,−302,202,−40,− 145,315,−435,445,−245,},
{−154,315,−344,288,−194,81,29,−134,226,−306,354,− 368,344,−290,212,−95,},
{134,−281,352,−357,343,−350,347,−295,258,−254, 234,−181,130,−98,75,−36,}.

A 32×32 transform matrix:
{−64,−72,−84,−98,−109,−125,−150,−178,−210,−234,− 253,−271,−297,−313,−329,−341,−344,−346,−346,−345,− 338,−332,−331, −320,−306,−289,−271,−238,−206,−184,− 166,−135,},
{−208,−254,−302,−348,−372,−388,−387,−374,−362,− 352,−333,−281,−226,−180,−126,−63,2,60,101,133,163, 199,228,246, 266,275,269,258,235,203,182,158,},
{−163,−200,−219,−242,−257,−259,−236,−190,−142,−78,− 1,85,159,229,285,330,352,348,314,251,179,98,−5,−115,− 220, −304,−361,−385,−397,−389,−352,−286,},
{−185,−237,−282,−320,−315,−269,−170,−33,95,212,291, 341,369,350,281,173,50,−85,−195,−298,−361,−384,−359,− 280, −154,−17,102,217,281,291,283,231,},
{−251,−322,−346,−310,−213,−74,75,215,334,387,359,251, 107,−63,−210,−311,−350,−306,−206,−94,51,197,300,351, 318, 207,64,−86,−218,−304,−321,−287,},
{−159,−194,−203,−175,−98,23,143,250,314,283,161,−21,− 208,−330,−351,−255,−84,125,315,402,351,186,−46,−255,− 385, −399,−308,−112,126,308,392,369,},
{−344,−388,−329,−152,92,326,438,399,244,1,−247,−401,− 381,−214,65,303,399,309,107,−116,−272,−290,−206,−60, 97, 188,207,154,28,−99,−164,−171,},
{−317,−323,−203,20,230,326,243,57,−133,−267,−246,− 119,91,289,340,208,−50,−312,−390,−246,17,276,368,275, 31, −229,−389,−341,−115,148,346,376,},
{−319,−328,−171,70,315,388,226,−89,−350,−349,−106, 224,385,273,−29,−309,−348,−140,160,336,288,45,−216,− 327, −216,27,236,321,221,−2,−226,−312,},
{−258,−213,−29,177,299,215,−54,−308,−347,−55,305,390, 158,−203,−396,−248,146,413,314,−55,−360,−356,−71,225, 329, 172,−115,−307,−261,−41,216,314,},
{−380,−277,61,411,404,20,−389,−438,−53,381,379,25,− 291,−320,−19,301,243,−67,−258,−192,57,242,205,−33,− 239, −223,8,258,280,83,−150,−273,},
{224,159,−68,−262,−185,91,265,159,−179,−275,−18,253, 223,−89,−302,−160,235,357,17,−388,−309,136,396,272,− 148, −457,−261,227,455,238,−177,−374,},
{320,150,−201,−351,−106,267,290,−61,−374,−179,279, 381,−58,−432,−158,345,326,−147,−388,−96,299,272,−76,− 316, −166,195,292,30,−268,−231,62,267,},
{−462,−119,372,371,−74,−437,−100,438,240,−291,−283, 143,321,1,−314,−127,226,210,−141,−291,9,292,148,− 221,−269, 60,298,119,−219,−270,36,276,},
{201,32,−180,−165,86,256,−11,−301,−36,313,72,−323,− 130,336,188,−355,−205,321,215,−261,−258,167,329,−23,− 395, −174,336,343,−203,−475,−4,432,},
{286,−10,−301,−112,256,190,−243,−265,270,290,−307,− 317,386,292,−432,−220,370,213,−279,−216,190,240,− 117,−287, 63,322,−24,−319,−33,291,87,−248,},
{−239,38,263,38,−260,−78,284,72,−351,15,370,−67,−391, 135,360,−270,−217,375,61,−399,30,374,−18,−376,21,363, 27, −359,−68,388,111,−328,},
{218,−44,−249,0,224,−3,−231,44,250,−178,−182,269,63,− 324,114,306,−315,−171,429,24,−461,72,429,−138,−393, 192, 340,−259,−289,334,230,−332,},
{393,−164,−402,127,390,−159,−334,245,201,−319,5,287,− 193,−153,292,−53,−268,259,109,−355,112,325,−289,−216, 386,28,−338,105,272,−210,−195,244,},
{−299,179,312,−197,−213,253,103,−282,59,233,−214,−90, 315,−178,−180,410,−226,−224,435,−159,−291,371,35,− 397, 231,237,−349,−18,339,−193,−232,251,},
{250,−190,−169,207,58,−230,42,247,−206,−142,372,− 187,−205,383,−225,−114,380,−374,37,368,−413,7,394,− 304,−129, 364,−162,−204,340,−65,−300,233,},
{−240,182,193,−253,−84,368,−189,−282,494,−232,−187, 431,−285,−67,329,−338,114,203,−348,216,30,−229,235,− 11, −249,279,−18,−280,296,47,−359,230,},
{338,−377,−162,506,−271,−243,441,−186,−179,369,−308, 16,273,−307,120,109,−250,249,−103,−96,212,−222,71,162, −274,154,100,−305,236,94,−370,258,},
{338,−505,110,445,−593,236,212,−438,362,−122,−152, 293,−243,117,18,−166,230,−164,38,91,−205,215,−61,− 157,246, −128,−94,242,−167,−93,304,−198,},
{−209,412,−333,45,284,−457,385,−127,−150,344,−371, 218,29,−213,286,−256,112,85,−261,323,−218,−18,266,− 338,187, 86,−292,264,−55,−206,316,−172,},
{214,−371,307,−107,−109,237,−270,210,−72,−75,183,− 253,249,−182,45,125,−267,317,−263,88,169,−376,397,− 193,−108, 356,−419,224,102,−376,459,−248,},
{192,−390,387,−265,83,96,−204,238,−249,237,−132,−27, 156,−216,206,−137,36,88,−225,287,−238,73,157,−345,417, −344,127,146,−382,488,−442,221,},
{−138,275,−314,248,−121,−36,169,−251,307,−348,304,− 152,−38,234,−369,439,−460,421,−320,176,−12,−155,259,− 294, 259,−168,4,164,−250,266,−226,107,},
{93,−198,246,−273,247,−183,115,−8,−106,244,−380,481,− 528,484,−379,238,−79,−70,210,−324,376,−375,288,−131, 2, 98,−164,176,−150,106,−59,22,},
{−126,269,−323,321,−283,235,−177,91,−7,−43,80,−135, 177,−206,243,−281,311,−349,379,−397,410,−384,309,− 185,37, 119,−250,320,−329,282,−213,98,},
{−113,238,−305,352,−399,454,−483,461,−406,366,−328, 284,−240,208,−177,159,−162,169,−185,205,−212,196,− 174,156, −152,161,−140,107,−68,34,−18,7,}, {49,−105,126,−132,160,−183,182,−161,132,−110,98,−78, 56,−38,17,1,−20,38,−57,105,−184,268,−347,413,−473, 535,−556, 526,−445,338,−228,97,}.

Figure 3:
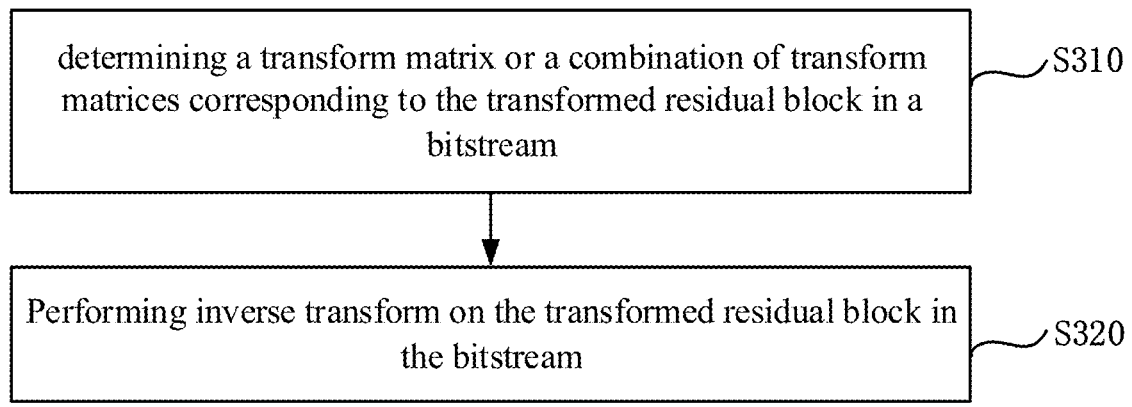
FIGS. 3 and 4 are flowcharts showing the execution of a decoding transform method according to an embodiment of the present specification.

Further, based on the encoding transform methods of the embodiments of the present specification, embodiments of the present specification further provide a decoding transform method. As shown in FIG. 3, in an embodiment, a decoding transform method comprises:

S310, determining a transform matrix or a combination of transform matrices corresponding to the transformed residual block in a bitstream;

S320, performing inverse transform on the transformed residual block in the bitstream using the transform matrix or the combination of transform matrices determined in S310.

Specifically, in an embodiment, in S310, determine a transform matrix or a combination of transform matrices corresponding to the transformed residual block in the bitstream, according to the transform selection flag read from the bitstream.

Further, in an embodiment, in S310, the determining the transform matrix or the combination of transform matrices corresponding to the transformed residual block in the bitstream, specifically comprises:

determining the source of the prediction residual block, and determining a transform matrix or a combination of transform matrices corresponding to the transformed residual block in the bitstream based on the source of the prediction residual block, wherein the source of the prediction residual block includes intra-prediction and inter-prediction.

Further, in an embodiment, the transform matrix (or matrices) used for performing decoding transform include MMT and/or DCT transform matrices.

Figure 4:
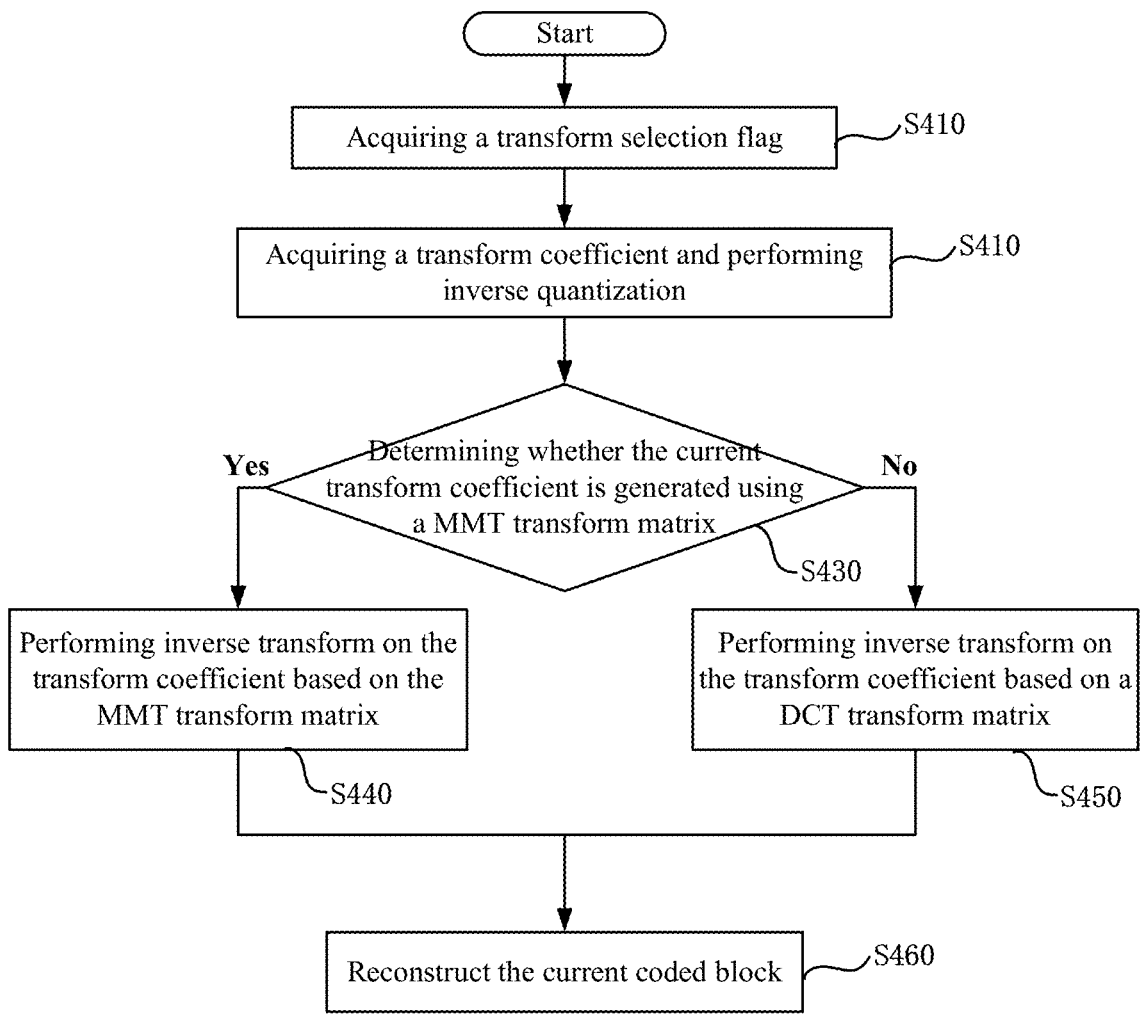

Specifically, as shown in FIG. 4, in an embodiment, corresponding to an encoding transform method performed using MMT matrix and DCT transform matrix, a corresponding decoding transform method comprises:

S410, acquiring a transform selection flag in a bitstream;

S420, acquiring a transform coefficient (a transformed residual block) in the bitstream and performing inverse quantization on the transform coefficient;

S430, determining whether the current transform coefficient is generated using a MMT transform matrix, according to the transform selection flag;

S440, performing inverse transform on the transform coefficient based on the MMT transform matrix, if the current transform coefficient is generated using a MMT transform matrix;

S450, performing inverse transform on the transform coefficient based on a DCT transform matrix, if the current transform coefficient is not generated using a MMT transform matrix;

S460, reconstructing the current coded block based on the inverse transform result of S440 or S450.

Figure 5:
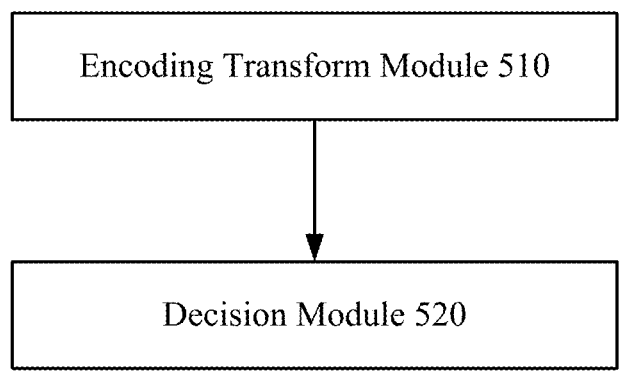
FIG. 5 is a structural block diagram of an encoding transform system according to an embodiment of the present specification.

Further, based on the encoding transform methods of the embodiment of the present specification, embodiments of the present specification further provide an encoding transform system. As shown in FIG. 5, in an embodiment, the system comprises:

an encoding transform module 510, configured to perform transform-encoding on a prediction residual block separately using a plurality of transform matrices, to obtain transformed residual blocks;

a decision module 520, configured to determine, by a rate-distortion optimization decision, a transform matrix or a combination of transform matrices matching the residual characteristic of the prediction residual block from the plurality of transform matrices, and determine a transformed residual block to be outputted in a bitstream, on the basis of the transformed residual blocks outputted from the encoding transform module 410.

Figure 6:
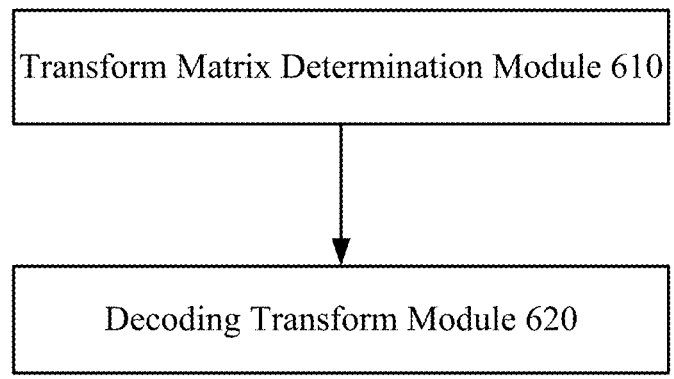
FIG. 6 is a structural block diagram of a decoding transform system according to an embodiment of the present specification.

Further, based on the decoding transform methods of the embodiment of the present specification, embodiments of the present specification further provide a decoding transform system. As shown in FIG. 6, in an embodiment, the system comprises:

a transform matrix determination module 610, configured to determine a transform matrix or a combination of transform matrices corresponding to the transformed residual block in the bitstream;

a decoding transform module 620, configured to perform inverse transform on the transformed residual block in the bitstream using the transform matrix or the combination of transform matrices determined by the transform matrix determination module 510.

Based on the method of the embodiments of the present specification, embodiments of the present specification further provide a computer-readable medium with computer readable instructions that can be executed by a processor to perform the method described in the embodiments of the present specification.

Based on the method of the embodiments of the present specification, embodiments of the present specification further provide a device used for information processing at the user side, the device includes a memory for storing computer program instructions and a processor for executing program instructions, and the device is triggered to perform the method described in the embodiments of the present specification when the computer program instructions are executed by the processor.

In the 1990s, it was easy to identify improvements to a technology were whether improvements to hardware (for example, improvements to circuit structures such as diodes, transistors, switches, etc.) or improvements to software (improvements to process flow). However, with the development of technology, many of the improvements to process may now be considered as direct improvements to the hardware (such as circuit structure). Designers always get corresponding hardware circuit structure by programming the improved process into the hardware circuit. Therefore, it's hard to say that an improvement of process cannot be implemented with hardware entity modules. For example, a Programmable Logic Device (PLD) (such as a Field Programmable Gate Array (FPGA)) is an integrated circuit and its logic function is determined by programming the device by users. Designers programmatically "integrate" a digital system onto a single PLD without designing and fabricating a dedicated integrated circuit chip by a chip manufacturer. Moreover, today, instead of manually manufacturing integrated circuit chips, the programming process is mostly implemented using a software as "logic compiler", which is similar to the software compiler used in program development process, and the original code to be compiled also needs to be written in a specific programming language called Hardware Description Language (HDL), and there are more than one kind of HDLs, such as BEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., wherein VHDL (Very-High-Speed Integrated Circuit Hardware Description Language) and Verilog are the most commonly used. It should also be clear to those skilled in the art that, the hardware circuit that implements the logic process flow may be easily got only using above hardware description languages to logically program the process and to program the process into the integrated circuit.

A controller may be implemented in any suitable manner, for example, the controller may take a form of, for example, a microprocessor or a processor, a computer readable medium storing the computer readable program code (for example, software or firmware) executable by the (micro) processor, logic gates, switches, Application Specific Integrated Circuit (ASIC), programmable logic controllers and embedded microcontrollers, and examples of the controllers include but not limited to the following microcontrollers: ARC 625D, Atmel AT91SAM, Microchip PIC18F26K20 and Silicone Labs C8051F320, and a memory controller may also be implemented as a part of the control logic of a memory. It is known to those skilled in the art that, in addition to implement the controller by the way of purely computer readable program code, it is entirely possible to implement the same function in a form of logic gates, switches, Application Specific Integrated Circuit (ASIC), programmable logic controllers, embedded microcontrollers, etc., by logically programming the method steps. Therefore, such a controller may be considered as a hardware component, and apparatuses included therein for implementing various functions may also be regarded as structures within the hardware component. Or even, apparatuses used to implement various functions may be regarded as software modules of implementation method and structures within the hardware component.

The system, apparatus, module or unit illustrated in the above embodiments may be implemented by a computer chip or an entity, or by a product with a certain function. A typical implementation device is a computer. Specifically, the computer may be, for example, a personal computer, a laptop, a cellular phone, a camera phone, a smart phone, a personal digital assistant, a media player, a navigation device, an email device, a gaming console, a tablet, a wearable device, or a combination of any devices from above.

For the convenience of description, the above apparatuses are described as different units according to the functions thereof respectively. Of course, when one or more embodiments of the specification are implemented, the functions of the units may be implemented in one or more software and/or hardware.

Those skilled in the art will understand that an embodiment of the specification may be provided as method, system or products of computer programs. Therefore, an embodiment of the specification may take the form of an entirely hardware embodiment, an entirely software embodiment, or an embodiment combining software and hardware. Also, an embodiment of the specification may take the form of a product of computer program embodied on one or more computer usable storage media (including but not limited to disk storage, CD-ROM, optical storage, etc.) having computer usable program code embodied therein.

The present description is described in terms of flowcharts and/or block diagrams of a methods, devices (systems), and computer program products according to embodiments of the specification. It should be understood that each flow and/or block of the flowcharts and/or block diagrams, and combinations of flows and/or blocks in the flowcharts and/or block diagrams may be implemented by computer program instructions. These computer program instructions may be provided to a processor of a general purpose computer, a special purpose computer, an embedded processor, or other programmable data processing device to produce a machine, and thus, instructions executed by a processor of a computer or other programmable data processing device generate devices for implementing the functions specified in one flow or more flows of the flowcharts or one block or more blocks of the block diagrams.

The computer program instructions may also be stored in a computer readable memory that may direct a computer or other programmable data processing device to operate in a particular manner, such that the instructions stored in the computer readable memory produce an article of manufacture comprising an instruction device that implements the functions specified in a flow or more flows in flowcharts and/or a block or more blocks in block diagrams.

These computer program instructions may also be loaded onto a computer or other programmable data processing device such that a series of operational steps are performed on a computer or other programmable devices to produce computer-implemented processing, and therefore instructions executed on a computer or other programmable device provide steps for implementing the functions specified in a flow or more flows in flowcharts and/or a block or more blocks in block diagrams.

In a typical configuration, the computing device includes one or more processors (CPUs), input/output interfaces, network interfaces, and memory.

The memory may include a form of a non-persistent memory, a random access memory (RAM), and/or a non-volatile memory in a computer readable medium, such as a read-only memory (ROM) or a flash memory (Flash RAM). Memory is an example of a computer readable medium.

The computer readable medium includes both permanent and non-permanent media, removable and non-removable media, and the information may be stored by any method or technology. Information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc-read only memory (CD-ROM), digital versatile disk (DVD) or other optical storage, magnetic tape cartridges, magnetic tape storage or other magnetic storage devices or any other non-transportable media that may be used to store information that may be accessed by a computing device. As defined herein, the computer readable media does not include transitory media, such as modulated data signals and carrier waves.

It should also be noted that the terms "comprise" or "include" or any other variations thereof are intended to encompass a non-exclusive inclusion, lead to a process, a method, a commodity, or a device including a series of elements includes not only those elements but also other elements not explicitly listed, or inherent in the process, the method, the commodity, or the device. Without more restrictions, elements defined by the phrase "include/comprise a . . . " do not exclude the presence of additional identical elements in the process, the method, the commodity, or the device including the elements.

This description may be described in the general context of computer-executable instructions executed by a computer, such as a program module. Generally, program modules include routines, programs, objects, components, data structures, and the like that perform particular tasks or implement particular abstract data types. It is also possible to implement the specification in a distributed computing environment in which tasks are performed by remote processing devices that are connected through a communication network.

The various embodiments in the specification are described in a progressive manner, and the same or similar parts between the various embodiments may be referred to each other, and each embodiment focuses on the differences from other embodiments. In particular, for the system embodiment, since it is basically similar to the method embodiment, the description is relatively simple, and the corresponding parts may refer to the description of the method embodiment.

The aspects described above are only for the embodiments of the specification, and are not intended to limit this application. Various changes and variations may be made to the application by those skilled in the art. Any modifications, equivalents, improvements, etc. made within the spirit and principles of the present application are intended to be included within the scope of the claims of the present application.

We claim:

1. An encoding transform method, comprising:
performing transform-encoding on a prediction residual block separately using a plurality of transform matrices, to obtain transformed residual blocks;
determining, by a rate-distortion optimization decision, a transform matrix or a combination of transform matrices matching residual characteristics of the prediction residual block from the plurality of transform matrices, and determining a transformed residual block to be outputted in a bitstream, on the basis of a transformed residual blocks;
the transform matrix or the combination of transform matrices includes a matrix-multiplication-based transform matrix or a two-dimensional integer transform matrix based on Discrete Cosine Transform Type II;
when determining the transform matrix or the combination of transform matrices matching the residual characteristics of the prediction residual block from the plurality of transform matrices by the rate-distortion optimization decision, the decision is made separately for row transform and column transform;
the transform matrix or the combination of transform matrices corresponding to the transformed residual block outputted in the bitstream is selected from one of the following four cases:
row transform and column transform each use a two-dimensional integer transform matrix based on Discrete Cosine Transform Type II;
row transform uses a matrix-multiplication-based transform matrix, column transform uses a two-dimensional integer transform matrix based on Discrete Cosine Transform Type II;
row transform uses a two-dimensional integer transform matrix based on Discrete Cosine Transform Type II, column transform uses a matrix-multiplication-based transform matrix;
row transform and column transform each uses a matrix-multiplication-based transform matrix.

2. The method of claim 1, the performing transform-encoding on the prediction residual block separately using the plurality of transform matrices, comprises, performing transform-encoding on the prediction residual block using two different transform matrices.

3. The method of claim 1, wherein the performing transform-encoding on the prediction residual block separately using the plurality of transform matrices, comprises:
based on a source of the prediction residual block, determining the transform matrix or the combination of transform matrices to be used for transform-encoding, wherein the source of the prediction residual block includes intra-prediction and inter-prediction.

4. The method of claim 1, when determining the transform matrix or the combination of transform matrices matching the residual characteristics of the prediction residual block from the plurality of transform matrices by the rate-distortion optimization decision, add a transform selection flag corresponding to the determined transform matrix or determined combination of transform matrices to the bitstream.

5. The method of claim 4, when adding a transform selection flag corresponding to the determined transform matrix or determined combination of transform matrices to the bitstream, determine an expression of the transform selection flag based on probabilities of various transform matrices and/or combinations of transform matrices to be selected.

6. An encoding transform method, comprising:
performing transform-encoding on a prediction residual block separately using a plurality of transform matrices, to obtain transformed residual blocks;
determining, by a rate-distortion optimization decision, a transform matrix or a combination of transform matrices matching residual characteristics of the prediction residual block from the plurality of transform matrices, and determining a transformed residual block to be outputted in a bitstream, on a basis of the transformed residual blocks;
adding a transform selection flag corresponding to the determined transform matrix or determined combination of transform matrices to the bitstream, and an expression of the transform selection flag is determined based on probabilities of various transform matrices and/or combinations of transform matrices to be selected;
as for an intra-predicted residual, the determining the expression of the transform selection flag based on probabilities of the various transform matrices and/or combinations of transform matrices to be selected, specifically comprises:
row transform and column transform each use a two-dimensional integer transform matrix based on Discrete Cosine Transform Type II, and the corresponding transform selection flag is 000;
row transform uses a matrix-multiplication-based transform matrix, column transform uses a two-dimensional integer transform matrix based on Discrete Cosine Transform Type II, and the corresponding transform selection flag is 01;
row transform uses a two-dimensional integer transform matrix based on Discrete Cosine Transform Type II, column transform uses a matrix-multiplication-based transform matrix, and the corresponding transform selection flag is 001;
row transform and column transform each uses a matrix-multiplication-based transform matrix, and the corresponding transform selection flag is 1.

7. An encoding transform method, comprising:
performing transform-encoding on a prediction residual block separately using a plurality of transform matrices, to obtain transformed residual blocks;

determining, by a rate-distortion optimization decision, a transform matrix or a combination of transform matrices matching residual characteristics of the prediction residual block from the plurality of transform matrices, and determining a transformed residual block to be outputted in a bitstream, on a basis of the transformed residual blocks;

adding a transform selection flag corresponding to the determined transform matrix or determined combination of transform matrices to the bitstream, and an expression of the transform selection flag is determined based on probabilities of various transform matrices and/or combinations of transform matrices to be selected;

as for an inter-predicted residual, the determining the expression of the transform selection flag based on probabilities of the various transform matrices and/or combinations of transform matrices to be selected, specifically comprises:

row transform and column transform each use a two-dimensional integer transform matrix based on Discrete Cosine Transform Type II, and the corresponding transform selection flag is 1;

row transform uses a matrix-multiplication-based transform matrix, column transform uses a two-dimensional integer transform matrix based on Discrete Cosine Transform Type II, and the corresponding transform selection flag is 01;

row transform uses a two-dimensional integer transform matrix based on Discrete Cosine Transform Type II, column transform uses a matrix-multiplication-based transform matrix, and the corresponding transform selection flag is 000;

row transform and column transform each use a matrix-multiplication-based transform matrix, and the corresponding transform selection flag is 001.

8. A decoding transform method, comprising:
determining a transform matrix or a combination of transform matrices corresponding to a transformed residual block in a bitstream;
performing inverse transform on the transformed residual block using the transform matrix or the combination of transform matrices;
the transformed residual block is obtained according to the method of claim 1.

9. The method of claim 8, the determining the transform matrix or the combination of transform matrices corresponding to the transformed residual block in the bitstream, specifically comprises:
determining the source of the prediction residual block, and determining a transform matrix or a combination of transform matrices corresponding to the transformed residual block in the bitstream based on the source of the prediction residual block, wherein the source of the prediction residual block includes intra-prediction and inter-prediction.

10. The method of claim 8, the determining the transform matrix or the combination of transform matrices corresponding to the transformed residual block in the bitstream, specifically comprises:
acquiring a transform selection flag in the bitstream, and determining a transform matrix or a combination of transform matrices corresponding to the transformed residual block in the bitstream based on the transform selection flag.

11. An encoding transform system, comprising:
an encoding transform module, configured to perform transform-encoding on a prediction residual block separately using a plurality of transform matrices, to obtain transformed residual blocks;
a decision module, configured to determine, by a rate-distortion optimization decision, a transform matrix or a combination of transform matrices matching the residual characteristics of the prediction residual block from the plurality of transform matrices, and determine a transformed residual block to be outputted in a bitstream, based on the transformed residual block;
the transform matrix or the combination of transform matrices includes a matrix-multiplication-based transform matrix or a two-dimensional integer transform matrix based on Discrete Cosine Transform Type II;
when determining the transform matrix or the combination of transform matrices matching the residual characteristics of the prediction residual block from the plurality of transform matrices by the rate-distortion optimization decision, the decision is made separately for row transform and column transform;
the transform matrix or the combination of transform matrices corresponding to the transformed residual block outputted in the bitstream is selected from one of the following four cases:
row transform and column transform each use a two-dimensional integer transform matrix based on Discrete Cosine Transform Type II;
row transform uses a matrix-multiplication-based transform matrix, column transform uses a two-dimensional integer transform matrix based on Discrete Cosine Transform Type II;
row transform uses a two-dimensional integer transform matrix based on Discrete Cosine Transform Type II, column transform uses a matrix-multiplication-based transform matrix;
row transform and column transform each uses a matrix-multiplication-based transform matrix.

12. A decoding transform system, comprising:
a transform matrix determination module, configured to determine a transform matrix or a combination of transform matrices corresponding to a transformed residual block in the bitstream;
a decoding transform module, configured to performing inverse transform on the transformed residual block using the transform matrix or the combination of transform matrices;
the transformed residual block is obtained according to the method of claim 1.

13. A non-transitory computer-readable medium with computer readable instructions that can be executed by a processor to perform the method of claim 1.

14. A device used for information processing at the user side, wherein the device includes a non-transitory computer-readable memory for storing computer program instructions and a processor for executing program instructions, and the device is triggered to perform the method of claim 1 when the computer program instructions are executed by the processor.

* * * * *